(12) United States Patent
Backus

(10) Patent No.: US 11,406,223 B2
(45) Date of Patent: *Aug. 9, 2022

(54) SYSTEM AND METHOD FOR SOUS VIDE COOKING

(71) Applicant: Alan Backus, Los Angeles, CA (US)

(72) Inventor: Alan Backus, Los Angeles, CA (US)

(73) Assignee: Alan L. Backus

( * ) Notice: Subject to any disclaimer, the term of this patent is extended or adjusted under 35 U.S.C. 154(b) by 0 days.

This patent is subject to a terminal disclaimer.

(21) Appl. No.: 17/314,776

(22) Filed: May 7, 2021

(65) Prior Publication Data

US 2021/0259468 A1   Aug. 26, 2021

Related U.S. Application Data

(63) Continuation-in-part of application No. 17/136,676, filed on Dec. 29, 2020, and a continuation-in-part of application No. 16/780,114, filed on Feb. 3, 2020, which is a continuation of application No. 14/723,758, filed on May 28, 2015, now Pat. No. 10,874,254.

(51) Int. Cl.
*A47J 37/06* (2006.01)
*A23L 5/10* (2016.01)
*A47J 37/12* (2006.01)
*A47J 27/10* (2006.01)

(52) U.S. Cl.
CPC ............ *A47J 37/1214* (2013.01); *A23L 5/17* (2016.08); *A47J 27/10* (2013.01); *A47J 37/0641* (2013.01)

(58) Field of Classification Search
CPC .... A47J 37/0641; A47J 37/12; A47J 37/1271; A47J 37/1295; A23L 5/17
USPC .......................................... 99/403, 467, 476
See application file for complete search history.

(56) References Cited

U.S. PATENT DOCUMENTS

| | | |
|---|---|---|
| 1,820,981 A | 3/1923 | Le Fever |
| 1,857,627 A | 2/1930 | Elder |
| 2,180,790 A | 11/1939 | Brummett |
| 2,906,301 A | 3/1956 | Mannon |
| 2,908,017 A | 4/1957 | Whaley |
| 2,926,360 A | 7/1958 | Erickson et al. |
| 2,877,467 A | 3/1959 | Cloud |
| 3,507,420 A | 4/1970 | Nelson et al. |
| 3,541,614 A | 11/1970 | Zorn |
| 3,771,333 A | 11/1973 | Jurjans |
| 3,809,116 A | 5/1974 | Sanner |
| 4,013,091 A | 3/1977 | Hudson |
| 4,042,984 A | 8/1977 | Butler |
| 4,080,985 A | 3/1978 | Eagle |
| 4,081,135 A | 3/1978 | Tomaro |
| 4,099,272 A | 7/1978 | Sowder |
| 4,106,338 A | 8/1978 | Castle |

(Continued)

FOREIGN PATENT DOCUMENTS

WO    WO2007132143 A2    11/2007

*Primary Examiner* — Reginald Alexander
(74) *Attorney, Agent, or Firm* — Ulmer & Berne LLP; John X. Garred

(57) ABSTRACT

Food preparation includes utilizing food immersion into low temperature cooking fluids, high temperature cooking fluids, or a combination of applications thereof. Foods are generally closely wrapped in vented, pliable, formidable outer skins. An example construction of such an outer skin is provided, as are examples of food preparation processes.

5 Claims, 23 Drawing Sheets

(56) References Cited

U.S. PATENT DOCUMENTS

| | | | |
|---|---|---|---|
| 4,174,743 A | 11/1979 | Beny et al. | |
| 4,177,719 A * | 12/1979 | Balaguer | H05B 3/0004 |
| | | | 219/541 |
| 4,243,066 A | 1/1981 | Lambie | |
| 4,258,746 A | 3/1981 | Hudson | |
| 4,295,488 A | 10/1981 | Book | |
| 4,327,764 A | 5/1982 | Biederman et al. | |
| 4,358,056 A | 11/1982 | Greenhut et al. | |
| 4,385,911 A | 5/1983 | Popeil et al. | |
| 4,409,694 A | 10/1983 | Barrett, Sr. et al. | |
| 4,431,025 A | 2/1984 | Edwards | |
| 4,467,482 A | 8/1984 | Dyer | |
| 4,471,937 A | 9/1984 | Sscragg | |
| 4,524,798 A | 6/1985 | Simard | |
| 4,535,931 A | 8/1985 | Bartok et al. | |
| 4,563,780 A | 1/1986 | Pollack | |
| 4,607,658 A | 8/1986 | Fraser et al. | |
| 4,628,956 A | 12/1986 | Roberts et al. | |
| 4,635,844 A | 1/1987 | Barrett, Sr. et al. | |
| 4,640,307 A | 2/1987 | Roberts | |
| 4,687,019 A | 8/1987 | Mayfield | |
| 4,753,265 A | 6/1988 | Barrett | |
| 4,757,305 A | 7/1988 | Peso | |
| 4,796,650 A | 1/1989 | Hwang | |
| 4,807,862 A | 2/1989 | Popeil et al. | |
| 4,903,724 A | 2/1990 | Simard | |
| 4,948,106 A | 8/1990 | Popeil et al. | |
| 5,017,143 A | 5/1991 | Backus et al. | |
| 5,025,509 A | 6/1991 | Holt et al. | |
| 5,030,027 A | 7/1991 | Bachrach et al. | |
| 5,133,788 A | 7/1992 | Backus | |
| 5,146,639 A | 9/1992 | Krause | |
| 5,159,723 A | 11/1992 | Benedict | |
| 5,166,886 A | 11/1992 | Molnar et al. | |
| 5,195,145 A | 3/1993 | Backus et al. | |
| 5,197,736 A | 3/1993 | Backus et al. | |
| 5,221,962 A | 6/1993 | Backus et al. | |
| 5,324,185 A | 6/1994 | Backus et al. | |
| 5,345,625 A | 9/1994 | Diemand | |
| 5,381,566 A | 1/1995 | Sonesson et al. | |
| 5,421,713 A | 6/1995 | Backus et al. | |
| 5,441,529 A | 8/1995 | Dorsch | |
| 5,515,990 A | 5/1996 | Popeil et al. | |
| 5,603,454 A | 2/1997 | Knapp et al. | |
| 5,692,675 A | 12/1997 | Arlie | |
| 5,720,991 A | 2/1998 | Gildersleeve et al. | |
| 5,731,012 A | 3/1998 | Backus et al. | |
| 5,850,848 A | 12/1998 | Jandal et al. | |
| RE36,147 E | 3/1999 | Backus et al. | |
| 5,882,116 A | 3/1999 | Backus | |
| 5,915,408 A | 6/1999 | Dudley | |
| 6,026,842 A | 2/2000 | Gallant | |
| 6,062,255 A | 5/2000 | Busick | |
| 6,142,064 A | 11/2000 | Backus et al. | |
| 6,170,390 B1 | 1/2001 | Backus et al. | |
| 6,173,645 B1 | 1/2001 | Backus et al. | |
| 6,240,838 B1 | 6/2001 | Backus et al. | |
| 6,250,214 B1 | 6/2001 | Backus et al. | |
| 6,253,665 B1 | 7/2001 | Backus et al. | |
| 6,265,695 B1 * | 7/2001 | Liebermann | A47J 36/24 |
| | | | 219/214 |
| 6,330,855 B2 | 12/2001 | Backus et al. | |
| 6,393,972 B1 | 5/2002 | Backus et al. | |
| 6,408,742 B1 | 6/2002 | Backus et al. | |
| 6,422,136 B1 | 7/2002 | Backus et al. | |
| 6,436,380 B1 | 8/2002 | Pond et al. | |
| 6,450,087 B2 | 9/2002 | Backus et al. | |
| 6,536,334 B2 | 3/2003 | Backus et al. | |
| 6,568,315 B2 | 5/2003 | Backus et al. | |
| 6,568,316 B1 | 5/2003 | Backus et al. | |
| 6,578,470 B2 | 6/2003 | Backus et al. | |
| 6,658,991 B2 | 12/2003 | Backus et al. | |
| 6,681,418 B1 | 1/2004 | Bierend et al. | |
| 6,732,388 B2 | 5/2004 | McKenna | |
| 6,742,199 B2 | 6/2004 | Conway et al. | |
| 6,742,445 B2 | 6/2004 | Backus et al. | |
| 6,743,007 B2 | 6/2004 | Backus et al. | |
| 6,760,931 B1 | 7/2004 | Mattson, Jr. et al. | |
| 6,782,805 B2 | 8/2004 | Backus et al. | |
| 6,782,806 B2 | 8/2004 | Backus et al. | |
| 6,814,957 B1 | 11/2004 | Pond et al. | |
| 6,837,150 B2 | 1/2005 | Backus et al. | |
| 6,840,161 B2 | 1/2005 | Backus et al. | |
| 6,874,408 B2 | 4/2005 | Backus et al. | |
| 6,886,589 B2 | 5/2005 | Oretti | |
| 6,895,610 B2 | 5/2005 | Olson | |
| 6,965,095 B1 | 11/2005 | Popeil et al. | |
| 6,988,445 B1 | 1/2006 | Backus et al. | |
| 6,994,107 B2 | 2/2006 | Sosa | |
| 7,021,203 B2 | 4/2006 | Backus et al. | |
| 7,021,204 B2 | 4/2006 | Backus et al. | |
| 7,065,883 B2 | 6/2006 | Popeil et al. | |
| 7,138,609 B2 | 11/2006 | Ronald et al. | |
| 7,146,659 B2 | 12/2006 | Mattson, Jr. et al. | |
| 7,153,120 B2 | 12/2006 | Backus et al. | |
| 7,219,618 B1 | 5/2007 | Shaughnessy | |
| 7,225,729 B2 | 6/2007 | Backus et al. | |
| 7,225,730 B2 | 6/2007 | Backus et al. | |
| 7,325,484 B1 | 2/2008 | Backus et al. | |
| 7,395,602 B2 | 7/2008 | Backus et al. | |
| 7,424,849 B2 | 9/2008 | Backus et al. | |
| 7,500,428 B2 | 3/2009 | Backus et al. | |
| 7,514,651 B2 | 4/2009 | Popeil et al. | |
| 7,626,142 B2 | 12/2009 | Backus et al. | |
| 7,681,494 B2 | 3/2010 | Backus et al. | |
| 7,739,948 B2 | 6/2010 | Backus et al. | |
| 7,878,111 B2 | 2/2011 | Backus et al. | |
| 7,998,514 B2 | 8/2011 | Backus et al. | |
| 8,017,167 B2 | 9/2011 | Backus et al. | |
| 8,065,759 B2 | 11/2011 | Smushkovich et al. | |
| 8,083,864 B2 | 12/2011 | Ho | |
| 8,186,265 B2 | 5/2012 | Popeil et al. | |
| 8,205,394 B1 | 6/2012 | Jackman et al. | |
| 8,225,436 B1 | 7/2012 | Cotton | |
| 8,309,151 B2 | 11/2012 | Popeil et al. | |
| 8,387,520 B2 | 3/2013 | Backus | |
| 8,707,857 B2 | 4/2014 | Popeil et al. | |
| 8,720,867 B2 | 5/2014 | Cunningham et al. | |
| 8,783,290 B2 | 7/2014 | Wang | |
| 8,807,022 B2 | 8/2014 | Backus | |
| 8,850,965 B2 | 10/2014 | Popeil et al. | |
| 8,869,686 B2 | 10/2014 | Backus | |
| 9,386,887 B2 | 7/2016 | Haddad | |
| 9,392,912 B2 | 7/2016 | Haddad | |
| 9,756,988 B2 | 9/2017 | Beuhring et al. | |
| 9,770,732 B2 | 9/2017 | Crawford | |
| 10,099,234 B2 | 10/2018 | Crawford | |
| 10,130,220 B2 | 11/2018 | Roberts | |
| 10,412,981 B2 | 9/2019 | Popeil | |
| 10,556,244 B2 | 2/2020 | Benitez | |
| 10,876,313 B1 | 12/2020 | Schmidt | |
| 2001/0009128 A1 | 2/2001 | Backus et al. | |
| 2001/0022140 A1 | 2/2001 | Backus et al. | |
| 2001/0032547 A1 | 2/2001 | Backus et al. | |
| 2001/0042449 A1 | 6/2001 | Backus et al. | |
| 2001/0046337 A1 | 6/2001 | Backus et al. | |
| 2001/0006627 A1 | 7/2001 | Pond et al. | |
| 2001/0039884 A1 | 11/2001 | Backus et al. | |
| 2002/0017201 A1 | 2/2002 | Backus et al. | |
| 2002/0023541 A1 | 2/2002 | Sanchez | |
| 2002/0023545 A1 | 2/2002 | Backus et al. | |
| 2002/0023546 A1 | 2/2002 | Backus et al. | |
| 2002/0088350 A1 | 2/2002 | Backus et al. | |
| 2002/0144607 A1 | 3/2002 | Backus et al. | |
| 2002/0108503 A1 | 4/2002 | Backus et al. | |
| 2002/0050212 A1 | 5/2002 | Backus et al. | |
| 2002/0062742 A1 | 5/2002 | Backus et al. | |
| 2002/0069768 A1 | 6/2002 | Backus et al. | |
| 2002/0157543 A1 | 6/2002 | Backus et al. | |
| 2002/0166458 A1 | 6/2002 | Backus et al. | |
| 2002/0108500 A1 | 8/2002 | Backus et al. | |
| 2002/0162169 A1 | 11/2002 | Bouchard | |
| 2002/0195003 A1 | 12/2002 | Backus et al. | |
| 2003/0019368 A1 | 1/2003 | Backus et al. | |

(56) References Cited

U.S. PATENT DOCUMENTS

| | | |
|---|---|---|
| 2003/0126997 A1 | 2/2003 | Backus et al. |
| 2003/0101877 A1 | 6/2003 | Backus et al. |
| 2003/0196261 A1 | 10/2003 | Olson |
| 2004/0006876 A1 | 1/2004 | Popeil et al. |
| 2004/0007494 A1 | 1/2004 | Popeil et al. |
| 2004/0144260 A1 | 7/2004 | Backus et al. |
| 2004/0194644 A1 | 10/2004 | Backus et al. |
| 2005/0178275 A1 | 1/2005 | Backus et al. |
| 2005/0056633 A1 | 3/2005 | Backus et al. |
| 2005/0058738 A1 | 3/2005 | Backus et al. |
| 2005/0088308 A1 | 4/2005 | King, Jr. |
| 2005/0284306 A1 | 8/2005 | Backus et al. |
| 2005/0204468 A1 | 9/2005 | Gunn |
| 2005/0235838 A1* | 10/2005 | Cohn ................ A23L 5/15 99/426 |
| 2005/0251906 A1 | 11/2005 | Scott et al. |
| 2006/0144248 A1 | 3/2006 | Backus et al. |
| 2006/0144250 A1 | 3/2006 | Backus et al. |
| 2006/0081594 A1 | 4/2006 | Popeil et al. |
| 2006/0081595 A1 | 4/2006 | Popeil et al. |
| 2007/0028780 A1 | 2/2007 | Popeil et al. |
| 2007/0028781 A1 | 2/2007 | Popeil et al. |
| 2007/0034621 A1 | 2/2007 | Popeil et al. |
| 2007/0145061 A1 | 3/2007 | Backus et al. |
| 2007/0101585 A1 | 5/2007 | Popeil et al. |
| 2007/0256571 A1 | 11/2007 | Popeil et al. |
| 2008/0250940 A1 | 2/2008 | Backus et al. |
| 2008/0075817 A1 | 3/2008 | Backus et al. |
| 2008/0092751 A1 | 4/2008 | Backus et al. |
| 2008/0163416 A1 | 7/2008 | Doo-Seok |
| 2008/0265594 A1 | 7/2008 | Popeil et al. |
| 2009/0050209 A1 | 2/2009 | Rautavuori et al. |
| 2009/0173240 A1 | 3/2009 | Backus et al. |
| 2009/0090248 A1 | 4/2009 | Backus et al. |
| 2009/0191322 A1 | 4/2009 | Popeil et al. |
| 2009/0120303 A1 | 5/2009 | Popeil et al. |
| 2009/0288483 A1 | 11/2009 | Varga et al. |
| 2010/0071565 A1 | 3/2010 | Backus et al. |
| 2010/0173050 A1 | 3/2010 | Backus et al. |
| 2010/0269712 A1 | 5/2010 | Popeil et al. |
| 2010/0260910 A1 | 6/2010 | Backus et al. |
| 2010/0303973 A1 | 8/2010 | Popeil et al. |
| 2010/0299829 A1 | 12/2010 | Trujillo |
| 2011/0132891 A1 | 2/2011 | Backus et al. |
| 2011/0083565 A1 | 4/2011 | Backus |
| 2011/0083566 A1 | 4/2011 | Backus |
| 2011/0203570 A1 | 8/2011 | Popeil et al. |
| 2012/0167778 A1 | 7/2012 | Popeil et al. |
| 2013/0180415 A1 | 3/2013 | Backus |
| 2014/0021191 A1* | 1/2014 | Moon ................ F26B 9/003 219/392 |
| 2014/0227411 A1 | 4/2014 | Backus |
| 2015/0101495 A1 | 4/2015 | Backus |
| 2015/0257574 A1* | 9/2015 | Hoare ................ A47J 27/10 99/342 |
| 2015/0354827 A1* | 12/2015 | Faraldi ................ A21B 3/04 426/510 |
| 2016/0324358 A1 | 3/2016 | Backus |
| 2016/0183709 A1 | 6/2016 | Backus |
| 2016/0220064 A1* | 8/2016 | Young ................ A47J 27/10 |
| 2016/0345610 A1 | 12/2016 | Backus |
| 2017/0074584 A1 | 3/2017 | Backus |
| 2017/0208825 A1 | 7/2017 | Backus |
| 2017/0247168 A1* | 8/2017 | Kim ................ B65D 75/38 |
| 2017/0311757 A1 | 11/2017 | Backus et al. |
| 2018/0000285 A1 | 1/2018 | Backus |
| 2018/0000286 A1 | 1/2018 | Backus |
| 2018/0000287 A1 | 1/2018 | Backus |
| 2018/0049590 A1 | 2/2018 | Backus |
| 2018/0064147 A1 | 3/2018 | Backus |
| 2018/0192825 A1 | 7/2018 | Popeil et al. |
| 2018/0213963 A1* | 8/2018 | Morey ................ A47J 27/04 |
| 2018/0255955 A1 | 9/2018 | Backus |
| 2018/0264241 A1 | 9/2018 | Backus |
| 2018/0310775 A1 | 11/2018 | DeGraye et al. |
| 2019/0055723 A1 | 2/2019 | McAlpiue et al. |
| 2019/0093324 A1 | 3/2019 | Backus |
| 2019/0104890 A1 | 4/2019 | Braddock et al. |
| 2019/0142215 A1 | 5/2019 | Popeil et al. |
| 2019/0142218 A1 | 5/2019 | Popeil et al. |
| 2019/0167027 A1 | 6/2019 | Backus |
| 2019/0281869 A1 | 9/2019 | Backus |
| 2019/0328179 A1 | 10/2019 | Popeil |
| 2019/0374066 A1 | 12/2019 | Backus et al. |
| 2020/0000174 A1 | 1/2020 | Plance et al. |
| 2020/0008451 A1 | 1/2020 | Popeil |
| 2020/0068926 A1 | 3/2020 | Backus et al. |
| 2020/0178720 A1 | 6/2020 | Backus |
| 2020/0199855 A1 | 6/2020 | Backus |
| 2020/0214500 A1 | 7/2020 | Popeil et al. |
| 2020/0229650 A1 | 7/2020 | Backus |
| 2020/0268024 A1 | 8/2020 | Backus et al. |
| 2020/0305645 A1 | 10/2020 | Backus |
| 2020/0329912 A1 | 10/2020 | Backus |
| 2021/0259452 A1* | 8/2021 | Cheng ................ A23L 5/13 |

\* cited by examiner

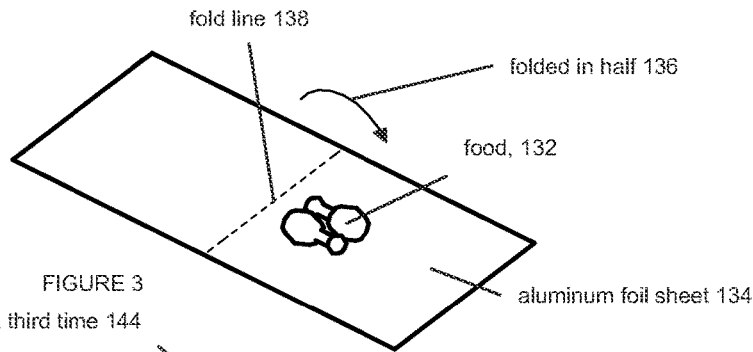
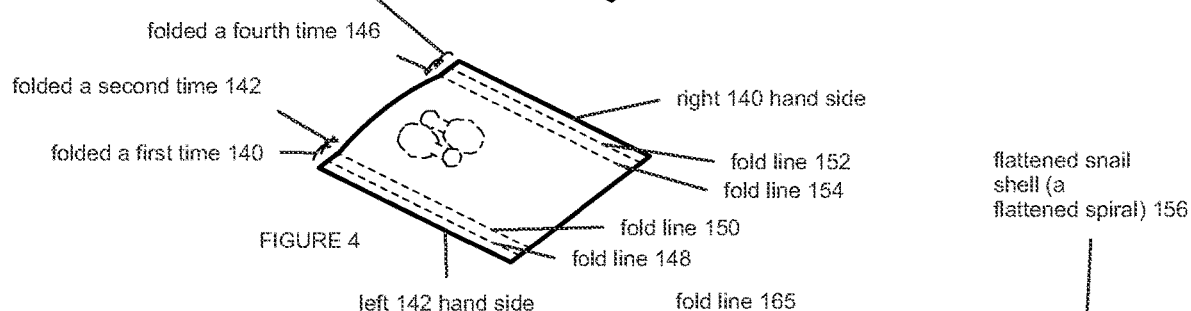
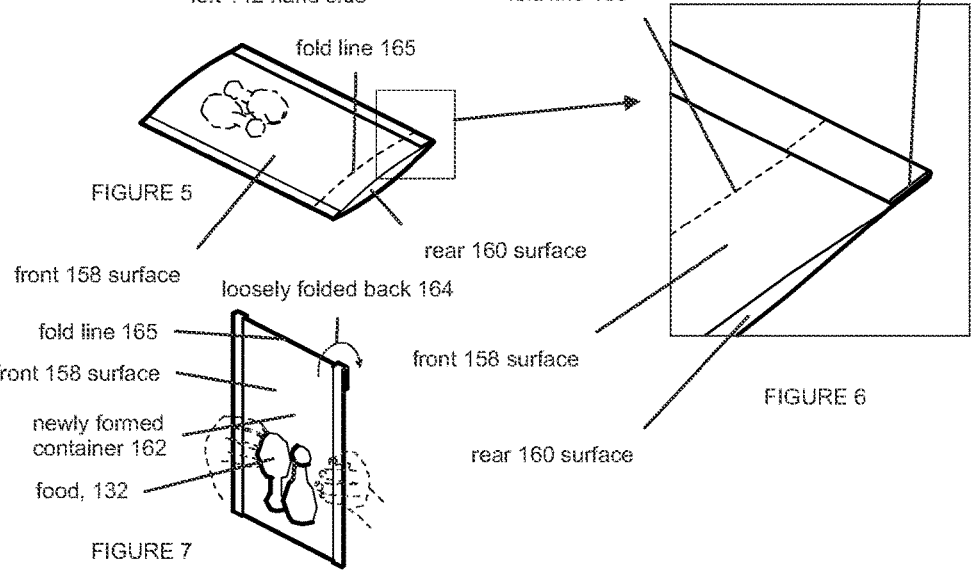
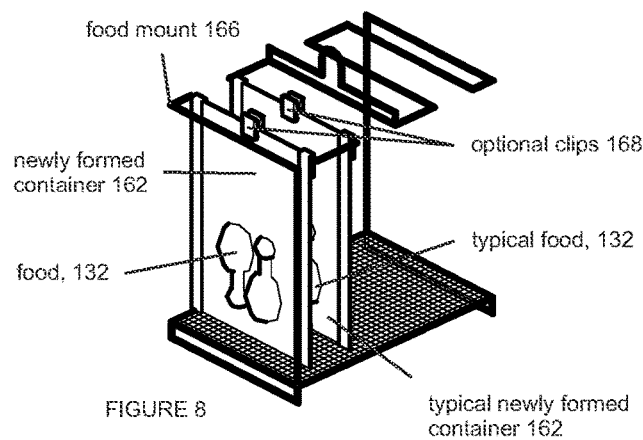

FOOD TYPE CODE

| FOOD | THICKNESS[1] | | FOOD TEMPERATURE | |
|---|---|---|---|---|
| | inch | cm | REFRIDGERATED | FROZEN |
| VEGETABLES | | | FOOD TYPE CODES | |
| Root | up to 1 | up to 2.5 | 003 | 004 |
| Carrots, Parsnips, Potato | 1-2 | 2.5-5 | 005 | 006 |
| Turnips, Celery Roots, Beets | | | 007 | 008 |
| Tender Asparagus, Broccoli, Corn, Cauliflower, Eggplant, Onions, Green Beans, Fennel, Squash, Fresh Peas | up to 1 | up to 2.5 | 009 | 010 |
| POULTRY | | | | |
| White Meat | | | | |
| Chicken Breast, bone in | 2 | 5 | 013 | 014 |
| Chicken Breast, boneless | 1 | 2.5 | 015 | 016 |
| Turkey Breast, bone in | 2.75 | 7 | 017 | 018 |
| Turkey Breast, boneless | 2 | 5 | 019 | 020 |
| Duck Breast | 1 | 2.5 | 021 | 022 |
| Dark Meat | | | | |
| Chicken Leg or Thigh, bone in | | | 027 | 028 |
| Chicken Thigh, boneless | 1 | 2.5 | 025 | 026 |
| Turkey Leg or Thigh | | | 029 | 030 |
| Duck Leg | | | 031 | 032 |
| Split Game Hen | 2.75 | 7 | 033 | 034 |
| PORK | | | | |
| Tenderloin | 1.5 | 4 | 035 | 036 |
| Baby Back Ribs | | | 037 | 038 |
| Chops, Cutlets | 1 | 2.5 | 039 | 040 |
| | 2 | 5 | 041 | 042 |
| Roast | 2.75 | 7 | 043 | 044 |
| Spare Ribs | 2.75 | 7 | 045 | 046 |
| Belly (quick) | 2 | 5 | 047 | 048 |
| Belly (slow) | 2 | 5 | 049 | 050 |
| BEEF, VEAL, LAMB, GAME | | | | |
| Tender Cuts | 1 | 2.5 | 051 | 052 |
| Tenderloin, Rib-eye, T-bone, | 2 | 5 | 053 | 054 |
| Tough Cuts and Grassfed[2] | | | 055 | 056 |
| Bison, Game | 1 | 2.5 | 057 | 058 |
| Lamb Roast or Leg | 2.75 | 7 | 059 | 060 |
| Spare Ribs | 2 | 5 | 061 | 062 |
| Flank Steak, Brisket | 1 | 2.5 | 063 | 064 |
| | 2 | 5 | 065 | 066 |
| RABBIT | | | | |
| Rabbit Leg | | | 069 | 070 |
| SEAFOOD | | | 071 | 072 |
| Fish | 0.5-1 | 1.25-2.5 | 073 | 074 |
| Tuna, Halibut, Snapper, Sole, | 1-2 | 2.5-5 | 075 | 076 |
| Salmon, Trout, Mackerel | | | 077 | 078 |
| Crustaceans, Mollusks | | | | |
| Lobster | 1 | 2.5 | 079 | 080 |
| Scallops | 1 | 2.5 | 081 | 082 |
| Shrimp | jumbo | jumbo | 083 | 084 |
| FRUIT | | | | |
| Firm | up to 1 | up to 2.5 | 085 | 086 |
| Apple, Pear | | | 087 | 088 |
| Soft Peach, Apricot, Plum, Mango, Papaya, Nectarine, Berries | up to 1 | up to 2.5 | 089 | 090 |
| EGGS | | | | |
| Soft-cooked in shell (quick) | large | large | 091 | 092 |
| Soft-cooked in shell (slow) | large | large | 093 | 094 |
| Hard-cooked in shell | large | large | 095 | 096 |
| Pasteurized in shell | large | large | 097 | 098 |
| Scrambled (5 eggs) | large | large | 099 | 100 |

Fig. 35

"food type code" 1410 food-description/food-amount lookup table, 1406

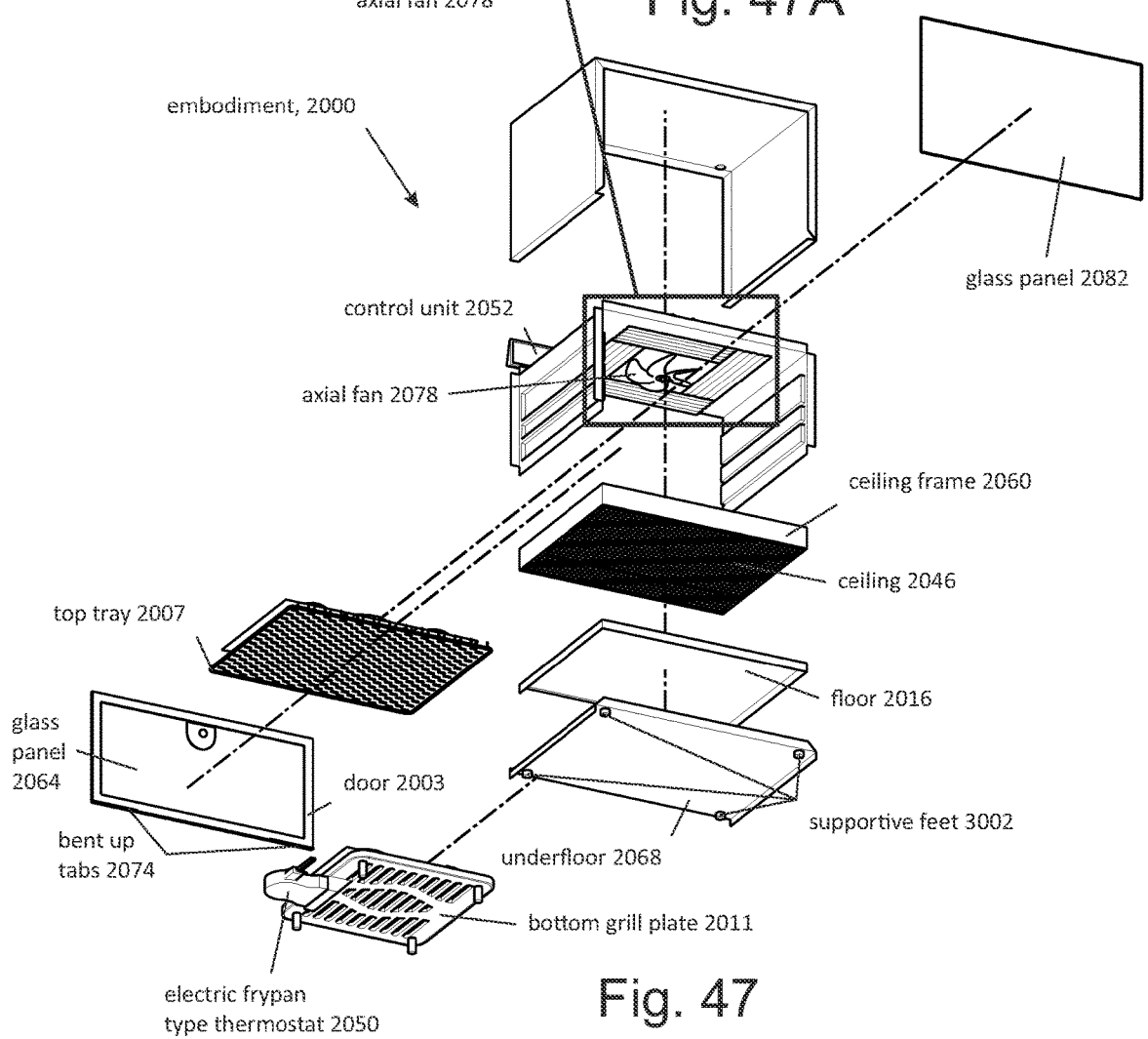

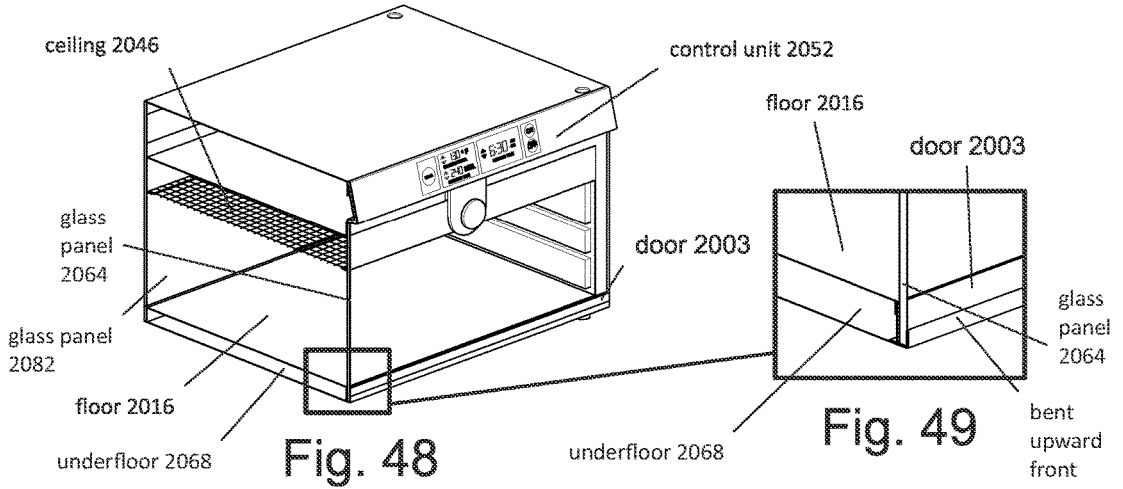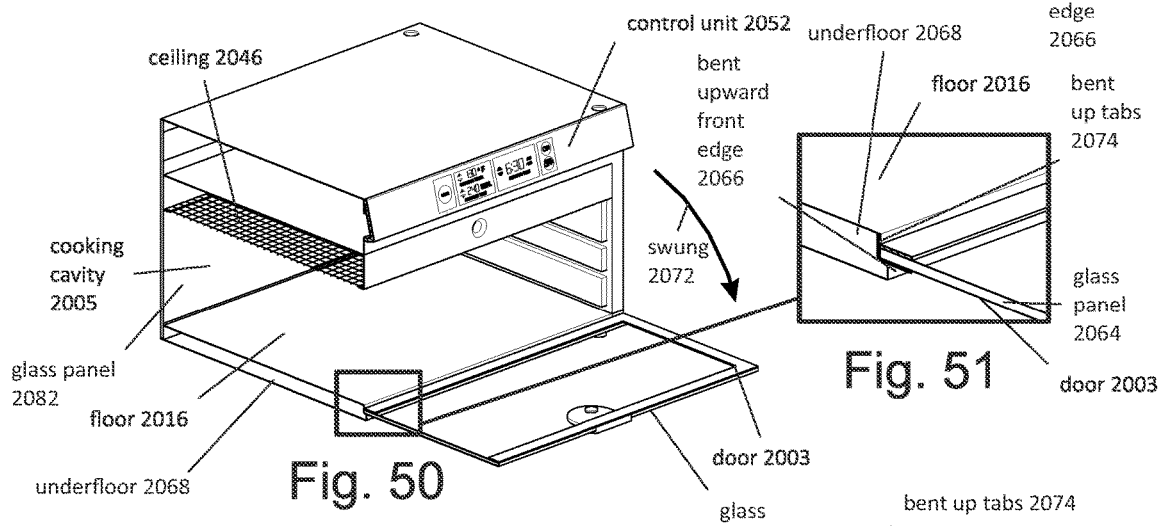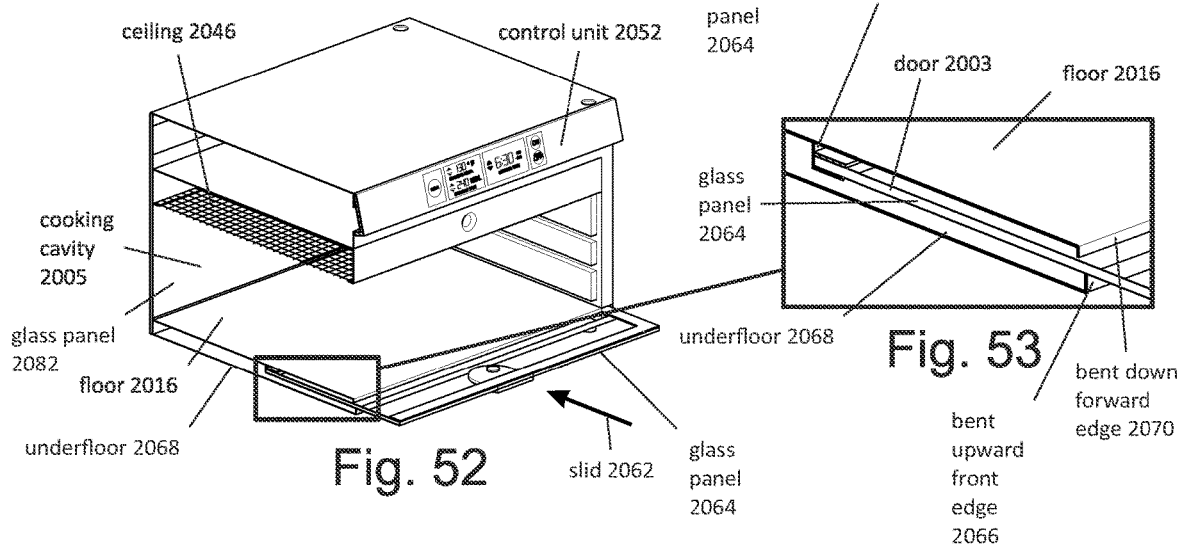

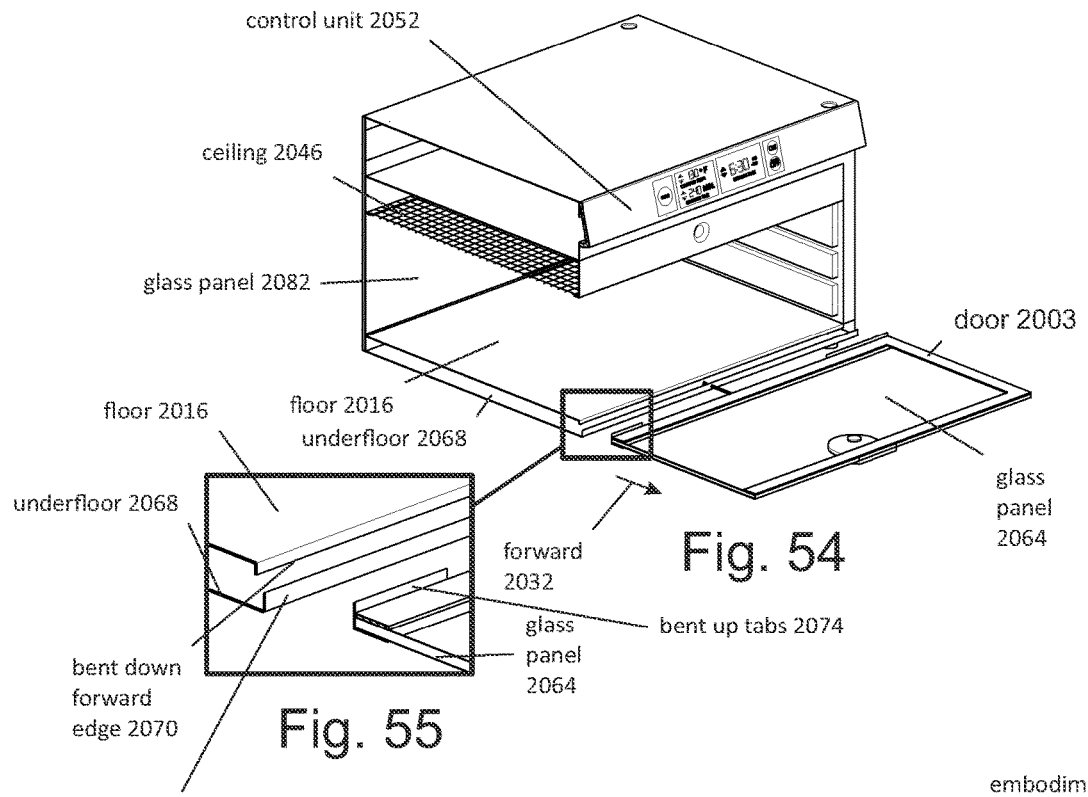
Fig. 54
Fig. 55
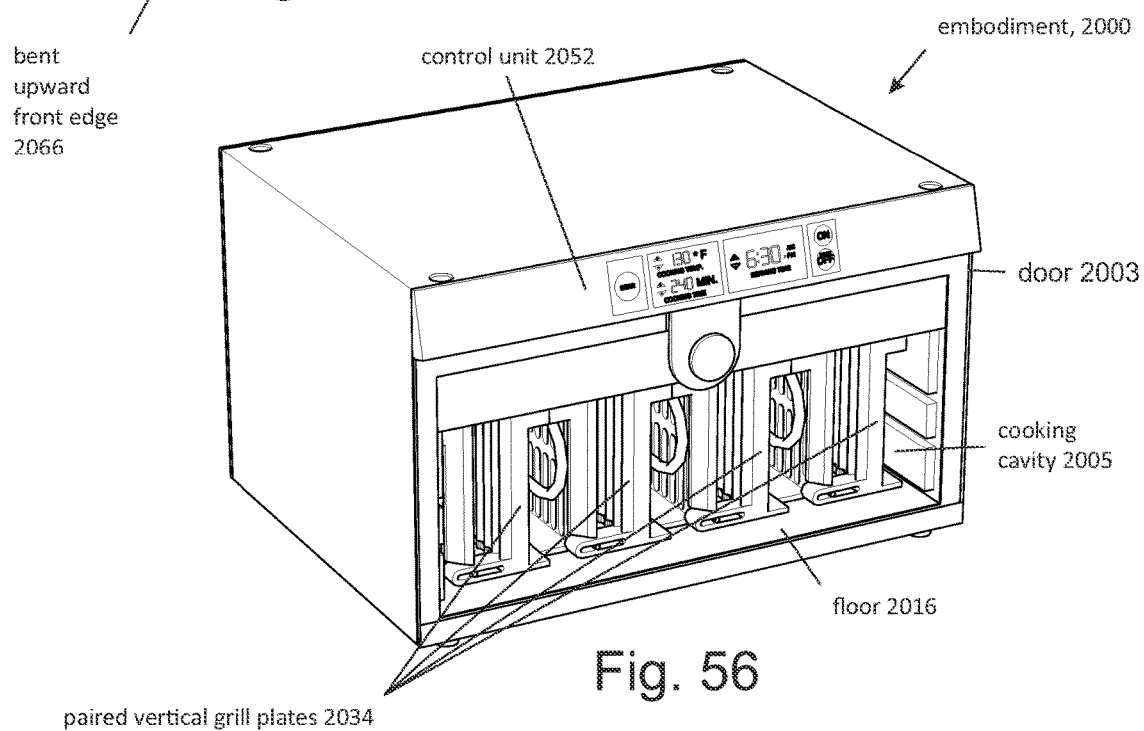
Fig. 56

SYSTEM AND METHOD FOR SOUS VIDE COOKING

CROSS-REFERENCE TO RELATED APPLICATIONS

This application is a Continuation-in-Part of U.S. Utility application Ser. No. 16/780,114 filed Feb. 3, 2020, which is a Continuation of U.S. Utility application Ser. No. 14/723,758 filed May 28, 2015 (U.S. Pat. No. 10,874,254, issued on Dec. 29, 2020). This application is also a Continuation-in-Part of U.S. Utility application Ser. No. 17/136,676 filed Dec. 29, 2020, which is a Continuation of U.S. Utility application Ser. No. 14/723,758 filed May 28, 2015 (U.S. Pat. No. 10,874,254, issued on Dec. 29, 2020), all of which are incorporated herein by reference.

TECHNICAL FIELD

This application relates generally to devices which cook foods in fluids, and to devices for sous vide cooking.

BACKGROUND

Sous vide (meaning in French, "under vacuum") cooking systems have been in use for many years. These devices have employed various methods to contain foods inside of heat sealed, air evacuated plastic bags, and then immersed the evacuated bagged foods, for extended periods, into controlled, below boiling temperature (herein typically 212° F., 100° C. at sea level) water.

In many cases, this method has produced foods with pale or otherwise undesirable exterior appearance. Grilling, pan searing, branding, or broiling, etc. have been commonly used as a post-cooking, third step, to surface color sous vide processed foods.

With sous vide, food quality has generally been considered to be excellent. This, in combination with the wide latitude cooking times that sous vide provides, probably accounts for at least two good reasons why so many well-regarded, high-end restaurants, both in the United States and in Europe, have, for many years, regularly used sous vide in the preparation of their cuisines.

Sous vide cooking has several, well recognized shortcomings.

One such shortcoming is the high cost of required equipment. Besides a typically several hundred dollar, to in excess of several thousand dollars investment in the sous vide cookers themselves, also required is a hundred dollar, to several thousand dollar, vacuum bag sealer (all amounts are in 2015 US dollars). This is probably at least partially why sous vide has been primarily used in commercial settings, such as the aforementioned high-end restaurants.

A second shortcoming is the high cost of plastic vacuum bags. Generally, each time a sous vide food article is prepared, it uses, and then disposes of such a bag. This is costly in dollar terms, as well as costly to the environment which supplies the materials to make these bags, absorbs any pollution that production of the plastic vacuum bags causes, and supplies the sites to dispose of them.

Further, as already mentioned, sous vide is generally a three separate step process, requiring at least: vacuum bagging, controlled temperature cooking, and then generally heat coloring (grilling, pan searing, branding, broiling, etc.).

BRIEF DESCRIPTION OF THE DRAWINGS

Various embodiments will become better understood with regard to the following description, appended claims and accompanying drawings wherein:

FIGS. 3 through 8 are views of an example embodiment of a food wrapping;

FIG. 35 is a food type code table, as explained herein.

FIG. 47 is a rear exploded view of embodiment 2000.

FIG. 47A is a detail enlargement of FIG. 47, as indicated in FIG. 47

FIG. 48 is a sectioned view of FIG. 36, as indicated in FIG. 36.

FIG. 49 is a detail of FIG. 48, as indicated in FIG. 48.

FIG. 50 is a section view of FIG. 37, as indicated in FIG. 37.

FIG. 51 is a detail of FIG. 50, as indicated in FIG. 50.

FIG. 52 is a section view of FIG. 38, as indicated in FIG. 38.

FIG. 53 is a detail of FIG. 52, as indicated in FIG. 52.

FIG. 54 is a section view of FIG. 37, as indicated in FIG. 37, but with door 2003 removed and moved forward 2032.

FIG. 55 is a detail of FIG. 54, as indicated in FIG. 54.

FIG. 56 is a perspective of embodiment 2000 with 4 paired vertical grill plates 2034 disposed within cooking cavity 2005.

SUMMARY

Figure 1:
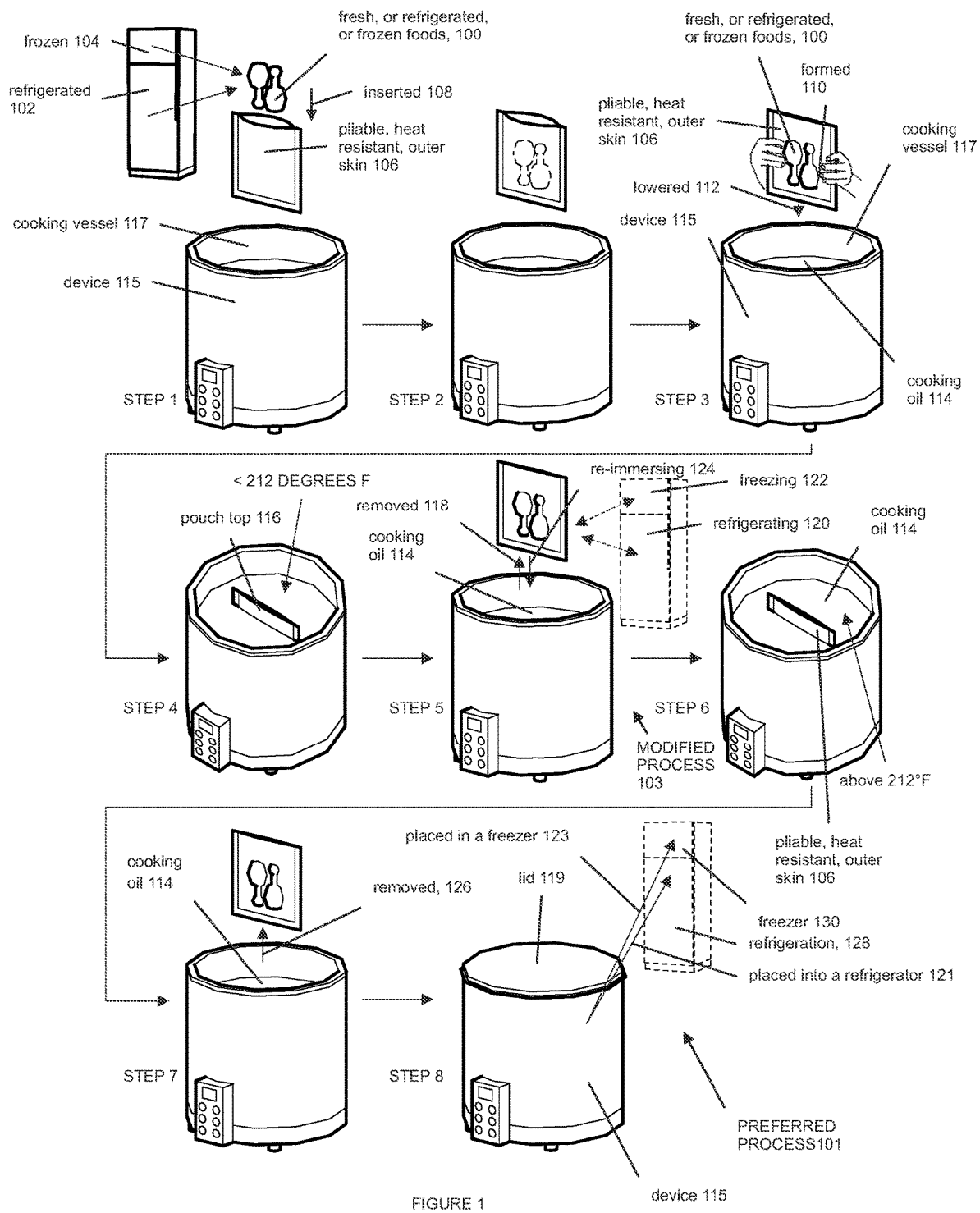
FIG. 1 is a diagram of an example embodiment of a cooking method.

As used herein, 'oil' or 'cooking oil' further suitably incorporates one or combinations of these materials, or any other suitable cooking fluid".

This document further clarifies the term suitable cooking fluid, to specifically include air, the oldest and most widely used cooking fluid.

Embodiments herein may sous vide cook foods, without the use of high-priced vacuum bag sealers, or expensive vacuum sealed bags. Embodiments may, as a non-limiting and non-exhaustive example, use sheet formed, malleable, thermally transmissive, food containment shells, which are formed face to face against the outer contours of the food used to cook, thus efficiently conducting heat into the foods being cooked. Unlike plastic bags, these shells, as a non-limiting and non-exhaustive example, being structurally rigid enough to retain their shape, even if the contained food is removed.

Pressure formation of these containment shells is substituted for vacuum used in conventional sous vide cooking, to hold vacuum bag surface in face-to-face contact with the food being cooked. Formation of these shells may be done with manual pressure, or other useful means.

As non-limiting and non-exhaustive examples, a block or blocks of resilient foam might be pressed against malleable skin surfaces pushing them against foods. Or a balloon-like air-filled or liquid filled bladder or bladders might press against the skins causing face-to-face food contact.

As used herein, sous vide cooking is defined as cooking foods in form fitting containment membranes, the membranes and contained food being disposed, for directed periods of time, in precisely temperature controlled fluid.

To heat foods to sous vide and food coloring cooking temperatures, embodiments of the present application may use impeller driven hot fluid.

Embodiments of the present application may heat a cooking chamber to temperatures hot enough to cause thermal food surface coloring. This may occur at any point before, during, or after sous vide cooking.

This compares with traditional sous vide cooking which uses water which boils at any temperatures above boiling, far below temperatures required to heat color outer food surfaces.

Further, air, unlike water, is able to change its cooking temperature quickly, allowing for rapid variance of cooking temperature, even briefly, if desirable, throughout cooking. As a non-limiting and non-exhaustive example, this may at least occur during thermal food surface coloring.

Instead of conventional countdown timers used in many ovens and other kitchen appliances, embodiments of the present inventions may, as a non-limiting and non-exhaustive example, use at least an inputted projected serving time and a food description, to calculate when food preparation processes need to occur in order to achieve that projected serving time.

Embodiments may also offer, either alternatively, or as an additional feature, the ability to manually control cooking durations and temperatures.

Air herein performs similar functions as oil in the parent application 2016/0345610. More specifically, air, not oil, is used to heat foods to sous vide temperatures. Air is also used to heat foods to higher temperatures needed to at least color outer food surfaces.

Air may be at least: easy to handle, cost free, and need little or no cleanup.

Further, as stated in parent application 2016/0345610, sous vide is expensive, typically at least because it requires costly vacuum bag sealers, and high-priced vacuum seal bags.

By contrast, embodiments of the present application may be far less expensive, at least by not requiring expensive vacuum bag sealers and high priced vacuum seal bags.

Expensive vacuum bag sealers, and high-priced vacuum seal bags, are well-known, and well-publicized deficiencies of traditional sous vide cooking.

Embodiments herein also may simplify the multistep sous vide cooking process by automatically setting all cooking conditions based on a projected serving time, and a description of the food being cooked.

Embodiments herein may also offer true "set it and come back and get it" (TM) convenience by requiring a user to just perform two steps, a first step of loading the food and setting the controls, and a second step to unload and serve the food. There are no other actions required on the part of the user.

DETAILED DESCRIPTION

The present application teaches example embodiments that include accomplishing some of the fundamental associated with sous vide, such as extended period cooking at controlled temperatures which are below water's boiling point. In other example embodiments, sous vide's above-described shortcomings are addressed.

Instead of using expensive vacuum sealable bags, example embodiments teach wrapping of food in pliable, liquid tight, formable sheet outer skins, such as by way of an example embodiment, skins made of generally relatively inexpensive aluminum foil. These containing skins typically are formed to contact wrap foods, with the skins resting upon the foods' exterior surfaces.

Such a simplified wrapping process eliminates the need for an expensive bag sealer, as well as the continuing need for costly, environmentally undesirable, vacuum sealable bags.

Additional example embodiments eliminate the relatively complex job of vacuum sealing foods in vacuum sealable plastic bags, by implementation of a relatively easy task of just wrapping the foods in any suitable sheet-like wrap for associated cooking conditions, including aluminum foil, cooking wrap, or the like.

The present application teach example embodiments wherein warm water used in sous vide to cook is substituted with warm or hot cooking temperature oil, including, but not limited to, common cooking oils such as corn oil, vegetable oil, olive oil, canola oil, peanut oil, as well as most other cooking oils, as well as combinations of these common oils, as well as combinations of these common oils with other ingredients as will be understood by one of ordinary skill in the art. The term "oil" as used in conjunction with alternatives herein connotes use of individual elements, any subcombination of individual elements as well as all listed elements simultaneously.

In other example embodiments, hydrogenated oils, shortenings, lard, or other materials which are normally solid, or semisolid at room temperature, but which are liquid or semi-liquid at temperatures above normal room temperatures, are implemented. As used herein, "oil" or "cooking oil" further suitably incorporates one or combinations of these materials, or any other suitable cooking fluid.

In further example embodiments, cooking oils, in combination with the above-described pliable, liquid tight, formable, outer skins (as an example, the illustrative aluminum foil wraps), enables accomplishing sous vide results below water boiling temperature cooking, as well as cooking temperatures at well above water's boiling point sufficient to desirable heat color outer food surfaces.

Example embodiments herein suitably implement a continuous cooking process, from food introduction to result in attractive food being ready for serving after preparation. Example embodiments include a continuous cooking process that need not be interrupted by a requirement to remove foods from the cooking baths in order to conduct the typical third sous vide process step, that of heat coloring the outer surfaces of the food, which in sous vide, generally requires interrupting the preparation process in order to move the food to a separate appliance such as a range top, oven, grill, broiler, or any other suitable heating mechanism.

Example embodiments herein provide several alternatives to sous vide while accomplishing some or all of its advantages. By way of example, users of the sous vide method have long taken sous vide prepared foods and refrigerated or frozen them after low-temperature sous vide cooking, and later reheated the sous vide prepared foods in preparation for serving. Conveniently, as taught herein, example embodiments allow for refrigeration or freezing of foods after low temperature cooking. However, it further improves over sous vide by facilitating food being reheated and partially cooked rapidly after such refrigeration or freezing. This is suitably accomplished by, after low-temperature cooking, and possible refrigeration or freezing that suitably follows re-immersing the room temperature, refrigerated or frozen foods back into a cooking fluid, while raising the fluid up to heating or cooking temperatures that are suitably above boiling water temperature.

The example embodiments noted above are suitably used independently, to rapidly heat, or reheat, or cook or otherwise prepare, many other fresh, or refrigerated, or frozen foods, in readiness for serving, or for other purposes. Such example embodiments are suitably implemented regardless of whether or not the foods have been prepared using any sous vide type processes, such as extended immersion in cooking liquid below boiling temperature.

Still further example embodiments teach additional preparation steps to efficiently and effectively accomplish cooking. Such additional procedures suitably include: adding spices, flavorings, or other additives to foods at one or more points during, before, or after any of the subject processes. At least part of the forgoing is enabled by wrapping foods, rather than vacuum bagging and heat sealing them, which allows for the foods to be easily unwrapped and rewrapped, once or multiple times, at virtually any time while such foods are being prepared using example embodiments, as well as before or after such preparation.

In an example embodiment, instead of being forced to put herbs, spices, or other flavorings, or other materials into a food container (plastic bag, or pliable wrap, by way example) only before sous vide-type cooking can occur, such ingredients might be added at one or multiple points in the cooking or other processes, such as, suitably around one quarter into the cooking process, and/or suitably three quarters through the cooking processes, etc., as hypothetical examples, to enhance the strength and/or character of their flavor contributions, and/or for other reasons. This contrasts with vacuum sealed plastic bags used in sous vide, which bags have very limited or no reseal capabilities at all.

In addition to the forgoing, oil temperatures above or below water boiling temperature are suitably altered at any point during any process step. This suitably includes extending or curtailing times at various temperatures, introducing new temperature steps, and/or altering times when intermediate procedures, such as, by way of example, addition of materials into or removal of materials from a food wrapper.

Example embodiments herein further facilitate added user convenience by permitting operations described herein while foods remain in their pliable cooking wrappers.

In an example embodiment, referring to FIG. 1, foods need not be removed from their wrappers to store them at room temperature, or under refrigeration, or within a freezer as described as options during step 5 (also likewise as preparation in step 1). Likewise, in step 5, users are provided with an option to remove foods 118, and then broil, bake, brand, grill, or otherwise treat them to add food surface color, analogously to sous vide. Foods need not necessarily be removed from their wrappers to perform such processes.

Most sous vide cooking apparatus are suitably used with the example embodiments disclosed herein. By way of further example, immersion circulation heaters, which are suitably fluid pumps operating in-line with a thermostat and a heater with a thermostat temperature being operator set, and regulating the heater and/or the pump, are suitably implemented for both low temperatures, such as below boiling, and high temperatures, such as above boiling, during food preparation. Such devices have been used in sous vide to pull water out of, and then re-introduce temperature controlled water back into sous vide immersion baths. These devices serve to circulate and control the temperatures of sous vide immersion baths.

In another example embodiment, an immersion circulation heater is suitably be used in example embodiment 170, to replace or augment heat coil 178, and/or thermal sensor 175, and provide thermal control and circulation to liquids contained within cooking vessel 176.

In another example embodiment, an immersion circulation heater might be used in example embodiment 226 for like purposes.

As further example embodiments, many sous vide fluid circulators, turbulence generators, heat sources, and/or heat sensors are suitably adapted for use with embodiments of present example embodiments, including with example embodiments taught herein.

It should be noted that in general, in present example embodiments, the food being prepared does not have direct contact with the warm or hot oil being used to prepare it. Thus, virtually any temperature and consistency suitable liquid, or semi liquid, or semi solid might be appropriate as cooking oils described herein. It is further understood that there is even no specific need for food grade materials to be used.

Likewise, because food does not have direct contact with cooking oil, there is no need for health concern regarding undesirable oil nutritional content, such as, by way of example an embodiments' high fat content, or the presence of trans fats. Thus, the herein use of the terms "oil" and "cooking oil," is understood to be inclusive of any such alternative materials as will be understood by one of ordinary skill in the art.

The present example embodiment use of cooking oils at least provides for efficient thermal transfer, potentially resulting in desirable shorter cooking times and/or more even cooking temperatures.

Because example embodiments can fully cook foods at temperatures well below temperatures used by conventional cooking means, such example embodiments may produce cooked food product with significantly higher nutritional content than conventionally cooked foods. Heat is known to deteriorate vitamin and other nutritional food content.

Insofar as the cooking oil used in example embodiments does not have direct contaminating contact with foods being prepared, the oil may have extensive usable life.

It should be noted that present example embodiment suitably utilizes aluminum foil to wrap foods, instead of sous vide's plastic bags. Aluminum foil is repeatedly recyclable, which is unlike the plastic bags which generally must be remanufactured using new raw materials, before each use, and must later be disposed of after each use.

Referring to FIG. 1 as an example embodiment, process 101 suitably starts with fresh, or refrigerated, or frozen foods, or foods in other states 100. All kinds, shapes, freshnesses, and sizes of foods suitably may be used, including, but not limited to: room temperature, refrigerated 102, or frozen 104, meats, fruits, vegetables, etc., of any appropriate size or shape, etc.

Such potential foods are well known and well documented in sous vide cooking (see the Information Disclosure Statement (IDS) included with this application—the information contained within IDS documents being hereby included into this specification by reference).

In STEPS 1 and 2, foods 100 are wrapped in pliable outer skins, such as, by way of an example embodiment, pliable, liquid tight, formable, outer skin 106, which is suitably formed from aluminum foil. A lubricant, such as example spray cooking oil, may optionally be applied to the inside of wrapping skin 106 and/or onto example foods 100.

In STEP 3, the outer surface of pliable, liquid tight, formable, outer skin 106 is formed 110 to contact and follow the outer surfaces of foods 100. Formation by hand is shown in FIG. 1, STEP 3, however, formation is suitably done, as an example embodiment, using sponge-like or pillow-like pads to press in on a pliable, liquid tight, formable, outer skin 106; or by sucking air out of outer skin 106 (i.e. pulling a vacuum), or by increasing air or fluid pressure around outer skin 106, or simply by relying on fluid pressure exerted by cooking oil 114, pressing against a pliable, liquid tight, formable, outer skin 106, when foods 100 enwrapped in pliable, liquid tight, formable, outer skin 106, are immersed into cooking oil 114.

In STEPS 3 and 4, pliable, liquid tight, formable, outer skin 106, including contained foods 100, is lowered 112 into cooking oil 114 which is contained in device 115. Device 115 is suitably cooking vessel 117 that is configured to generate various, generally operator directed, temperatures to fluids contained within cooking vessel 117.

For STEPS 3 and 4, cooking oil 114 is suitably heated to sous vide cooking temperatures, which are below the temperature of boiling water. The exact temperature to which oil 114 is heated is dependent on desired cooking outcome(s), as well as on the food nature, food temperature, and/or other factors. Such factors relative to cooking times and temperatures are understood by practitioners of sous vide.

Pliable, liquid tight, formable, outer skin 106 is suitably formed so it exits fluids out from, or adjacent to one of its edges, generally out its top 116, more easily than it exits fluids from elsewhere on its containment structure, including generally, any of pliable, liquid tight, formable, outer skin 106's lower portions. Alternatively, this easier fluid exit suitably occurs anywhere on pliable, liquid tight, formable, outer skin 106.

In general, the above structure functions to at least let steam and/or water vapor and/or expanding gases exit from containment pliable, liquid tight, formable, outer skin 106 during any of the present example embodiments cooking and other processes, so at least that steam and/or water vapor and/or expanding gases don't bloat or balloon pliable, liquid tight, formable, outer skin 106. It will be noted that this contrasts with sous vide, which inherently prevents fluids from exiting out of its heat sealed plastic vacuum bags.

As shown in STEP 4, pouch top 116, along with its fluid exit(s) are generally, although not necessarily, left above the surface of cooking oil 114. As a noted exception, everything up to and including the entirety of pliable, liquid tight, formable, outer skin 106 is suitably fully immersed.

In STEP 4, pliable, liquid tight, formable, outer skin 106, along with its contained food 100, is left in the sous vide, below boiling temperature cooking oil 114 for extended periods of time ranging from many minutes, to several days. These times are also well known to practitioners of sous vide, and have been extensively published, including many variations.

STEP 5 is optional. In this step, food is suitably removed 118 from cooking oil 114. As example embodiments, this suitably serves foods 100, or it is usable for other purposes, including, but not limited to, refrigerating 120, or freezing 122, or for other food preservation or other preparations of foods 100, or for other purposes.

As an example embodiment of this, removal of foods in STEP 5 is suitably used to prepare foods using other cooking techniques, including, but not limited to grilling, pan searing, branding, broiling, or any other suitably cooking or heating methods as will be understood by one of ordinary skill in the art.

STEP 5 suitably includes re-immersing 124 pliable, liquid tight, formable, outer skin 106 with contained foods 100, back into cooking oil 114, which is suitably raised to temperatures above boiling water, for further cooking or coloring of the surfaces of foods 100, or for serving, or for other purposes.

In STEP 6, foods 100, contained in pliable, liquid tight, formable, outer skin 106, are left in cooking oil 114, which is heated to above boiling water temperatures, for the time necessary to achieve one or more desired cooking outcome (s), possibly including, but not limited to, a desired level of food surface coloring, and/or a desired level of tenderness, and/or a desired level of sterility, and/or a desired serving temperature, and/or one or more other desired outcomes.

In STEP 7, foods 100, contained in pliable, liquid tight, formable, outer skin 106, are removed 126 from cooking oil 114 for serving, or for other purposes, such purposes possibly, but not necessarily including: refrigerating, freezing, or other methods of food preservation, or for other reasons.

In STEP 8, device 115 is inactive. Cooking oil 114 is suitably stored in cooking vessel 117, or in the container the cooking oil came in, or in other forms of containment; or is suitably directly disposed of, possibly using the container it came in, if it is no longer of a useful quality. Alternatively, it is suitably stored at room temperature, or under refrigeration 128, or within a freezer 130, or at other temperatures. It is also suitably stored in the open, or in one or more loosely or tightly sealed vessels, which suitably includes, but are not necessarily limited to, cooking vessel 117, or a container cooking oil 114 came in, or other suitable container or receptacle.

As another example embodiment, during inactivity, cooking vessel 117 suitably has lid 119 placed over it, and then lidded 119 device 115, or just lidded 119 cooking vessel 117 alone, is suitably left on the countertop, or placed into a refrigerator 128, or a freezer 130.

Use of pliable, liquid tight, formable, outer skins 106, helps seal in food flavors, juices and nutrients, during the cooking or other processes. This contrast with other food cooking methods, which not only cook off nutrients, but also allow them to drip, leach, and/or vaporize away. Even methods like pressure steam cooking (i.e. pressure cookers) which tout sealing in nutrients, still allow vaporization, leaching and/or dripping of nutrients into a cooking chamber. Embodiments of the present example embodiments allow for close wrapping of foods, which helps insure that the nutrients remain in close proximity to the foods.

As an alternative to the above example process 101, STEP 1 through STEP 5 (up to and through food removal 118), are suitably done independently of steps 6 through 8, and using water to replace cooking oil 114. A primary difference between this new modified process, herein identified as modified process 103, and sous vide's processes, being that the pliable, liquid tight, formable, outer skin 106, used in new modified process 103, replaces sous vide's evacuated and sealed plastic bags. Among other things, this may, as described earlier, simplify the sous vide process by at least eliminating vacuum bagging.

Referring to present example embodiments in general, with specific attention called to STEPS 1 through 5 above, as well as the treatment of foods analogous in sous vide to those occurring before STEP 1 or after STEP 5 above, most: recipes, procedures, preparations, food treatments, and other teachings which are given for sous vide, may be literally or principally be adapted to example embodiments, as will be understood by one of ordinary skill in the art.

Figure 2:
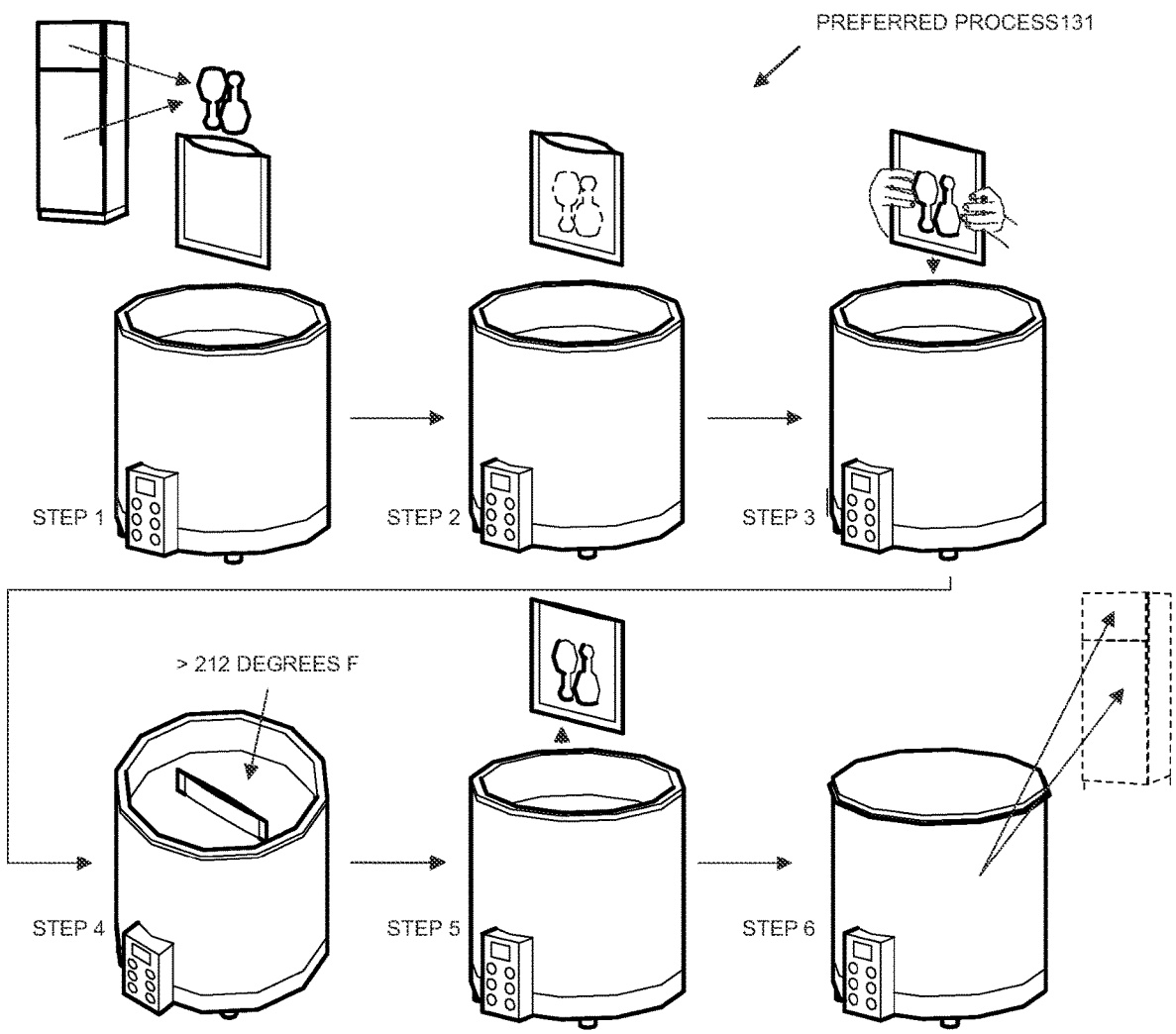
FIG. 2 is a diagram of an example embodiment of a cooking method.

Example Process 131—FIG. 2:

In FIG. 2, STEPS 1 through 3 are analogous to STEPS 1 through 3 in FIG. 1, with essentially the same descriptions as given in FIG. 1 for each respective STEP.

STEP 4 in FIG. 2 is similar to STEP 4 in FIG. 1, except cooking oil temperatures are raised to above boiling, and the cooking immersion time or times are appropriate for the higher temperatures, as well as for the desired cooking outcomes. As already noted herein, this allows for various food preparations, including, but not limited to: heat coloring or browning of foods, and/or rapid thawing, and/or heating of foods, and/or cooking of foods, and/or adding spices, flavorings or other additives to foods, and/or to achieve desired serving temperatures, and/or for other food preparations, and/or for other reasons.

The description of STEP 4 in FIG. 2 is analogous to that for STEP 4 in FIG. 1, with the temperature change alterations noted directly above.

STEPS 5 and 6 in FIG. 2 are analogous to STEPS 7 and 8, respectively, in FIG. 1, and are suitably described analogously.

Example process 131 is suitably used for a variety of purposes, including, but not limited to, being a step taken to further prepare foods after sous vide-type cooking, or to further prepare foods that have not been sous vide prepared, or to prepare foods that are frozen, refrigerated, or at room temperature, or for other purposes.

Example Fabrication of an Outer Food Containment Skin—FIGS. 3 through 8:

FIGS. 3 through 8 show an example embodiment, of how a present example embodiment outer food containment skin is suitably fabricated.

In FIG. 3, food 132 is placed on top of aluminum foil sheet 134, and aluminum foil sheet 134 is then folded in half 136, generally along fold line 138.

In FIG. 4, aluminum foil sheet 134 is again folded a first 140, a second 142, a third, 144, and a fourth time 146, along fold lines 148, 150, 152, and 154, respectively. The folds are then advantageously tightly compressively flattened.

As illustrated in FIGS. 5 and 6, additional folding 140, 142, 144, and 146 and compression produces liquid tight side seams which have a cross-section (reference in particular FIG. 6) resembling a flattened snail shell or crushed spiral 156.

In FIG. 7, the front 158 and rear 160 surfaces of folded aluminum sheet 134 are formed against the outer surface contours of food 132, and the top of newly formed container 162 is loosely folded back 164 generally along fold line 165.

From here, container 162 with its contents, food 132, is placed into cooking oil.

As shown in FIG. 8, this placement into cooking oil is suitably facilitated by mounting container 162, along with contained food 132, as well as zero, one, or more typical counterparts, on a food mount, such as non-limiting and non-exhaustive example food mount 166. Optional clips 168 suitably aid in this endeavor.

The directly above fabrication produces a food container formed so it expels fluids out one portion of its containment structure more easily than it expels fluids elsewhere. More specifically, this containment structure expels fluids out at its top, more easily than it expels fluids from its lower portions.

Figures 9, 10:
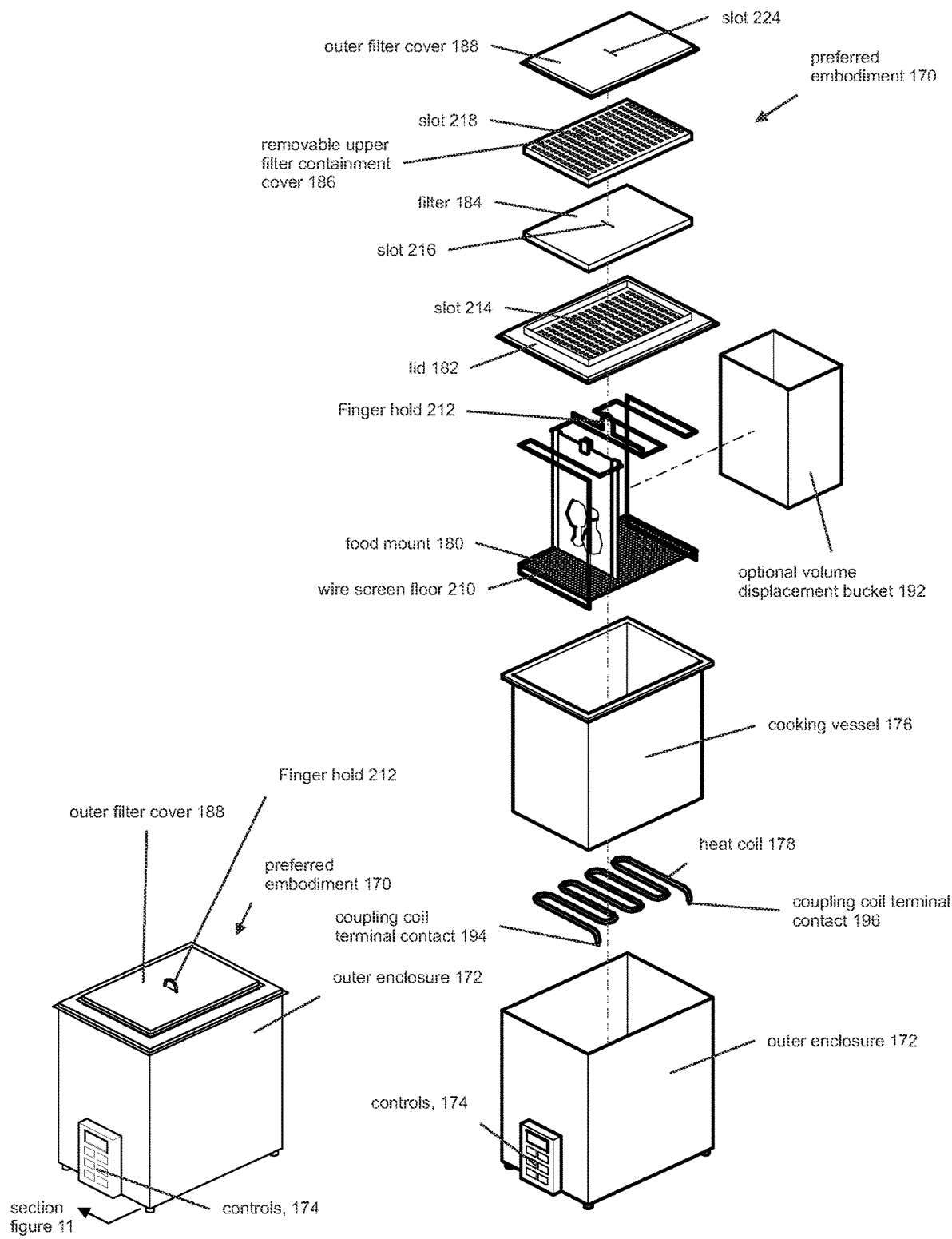
FIG. 9 illustrates an example embodiment of a food cooker.
FIG. 10, is an exploded view of an example embodiment of a food cooker.
Figure 11:
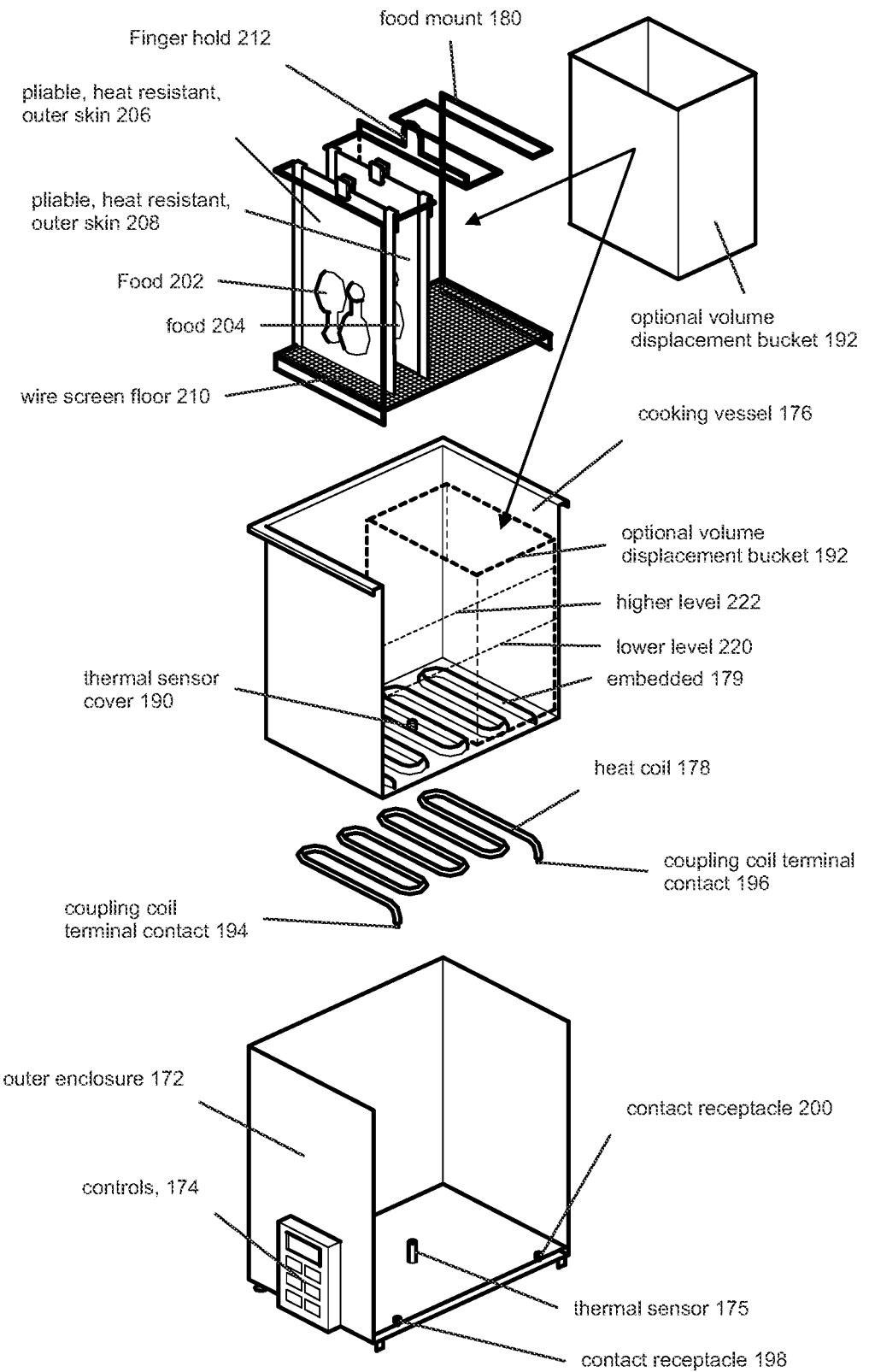
FIG. 11, is an exploded, cutaway perspective of an example embodiment of a food cooker with a section plane through one of its sides as indicated in FIG. 9.

Example Embodiment 170—FIGS. 9 Through 11:

FIGS. 9 through 11, as an example embodiment, illustrate example embodiment 170. Example embodiment 170 comprises: outer enclosure 172, which mounts controls 174 and thermal sensor 175 (FIG. 11), and selectively removably mounts cooking vessel 176, which includes heat coil 178 embedded 179 into cooking vessel 176's floor (particularly FIG. 11).

Also included in example embodiment 170 are food mount 180, which from time to time suitably removably rest within cooking vessel 176; and from time to time cooking vessel 176 is suitably covered by lid 182, which in turn mounts filter 184 under removable upper filter containment cover 186, which from time to time in turn, is suitably covered by outer filter cover 188, particularly between uses, at least to possibly reduce leakage of any possible undesirable odors.

Further included in embodiment 170, is high aspect ratio (taller than it is wide) thermal sensor cover 190 (FIG. 11), which protrudes upward from the floor of cooking vessel 176, and houses thermal sensor 175 when cooking vessel 176 is fully mounted within outer enclosure 172.

Optional volume displacement bucket 192, is suitably disposed within cooking vessel 176 from time to time to advantageously reduce cooking oil usage or to decrease warm-up times, or for other reasons.

Heat coil 178 has coupling coil terminal contacts 194 and 196, which mate with contact receptacles 198 and 200 respectively, when cooking vessel 176, is fully mounted within outer enclosure 172.

Foods 202 and 204 contained within pliable, outer skins 206 and 208 respectively, are shown mounted to food mount 180 (FIG. 11).

Food mount 180 comprises wire screen floor 210, which prevents foods from getting too close to heat coil 178 during cooking.

In general, as an example embodiment, food, mount 180 is suitably constructed from formed and joined, plated or coated, metal wire screening and metal rod.

Finger hold 212, generally located in the middle of the top of food mount 180 (FIGS. 9, 10, and 11 in particular), from time to time suitably simultaneously penetrate the assembly comprising lid 182, filter 184, and removable upper filter containment cover 186, through slots 214, 216, and 218 respectively (FIG. 10 in particular).

This advantageously allows lid 182, its mounted filter 184, and its removable upper filter containment cover 186 to be hand lifted as a unit, thus possibly reducing the chances of a user being splashed by cooking oil of any temperature, while removing or inserting food mount 180, from or into cooking vessel 176, or at other times. Under these circumstances, lid 182 suitably acts as a shield between user and oil contained in cooking vessel 176.

At any time during example embodiment 170 operations, outer filter cover 188 is suitably penetrated through slot 224 by finger hold 212 (FIG. 9. In particular). This allows outer filter cover 188 to freely be present or not, during any example embodiment 170 operations. As a general rule, however, outer filter cover 188 is present only when embodiment 170 is not in operation. A noted exception to this might be if embodiment 170 is used for food steaming, where outer filter cover 188 might advantageously help to build steam pressure within lid 182 covered cooking vessel 176.

Alternatively, food mount 180 suitably remains within cooking vessel 176 after assembled lid 182, including its filter 184, and removable upper filter containment cover 186 are removed. This is done simply by lifting lid 182 independently away from food mount 180.

Also, as an example embodiment, heat input into the cooking fluid (oil, as an example embodiment) contained within cooking vessel 176 for lower temperature cooking processes is suitably half or less of that used for higher temperature cooking processes.

As a specific example embodiment of this, heat coil 178 suitably utilizes 1700 watts of energy for higher temperature cooking processes and yet suitably uses less than 60 watts of energy for lower temperature cooking processes. This advantageously helps keep cooking oil temperatures more even by eliminating sharp spikes caused by an overly-powerful heater.

Also, as an example embodiment, this is suitably accomplished simply by having two heat coils (one low wattage, one high wattage), or having a heat coil constructed to have at least two different power ratings, or it is suitably done electronically, as an example embodiment, in a construction similar to that used in home light dimmers, or it is suitably accomplished using other methods or apparatus.

Optional open-topped, rectangular, fluid-tight, volume displacement bucket 192 is suitably mounted into, or removed from, cooking vessel 176 during any embodiment 170 related operation. When present, it displaces space normally occupied by oil within cooking vessel 176, with air contained within open-topped bucket 192. This suitably raises a cooking oil level from a reduced amount of cooking oil, at, as an example, a lower level 220, to a higher level 222 (FIG. 11 in particular).

This in turn suitably reduces oil usage when less food capacity is acceptable, or, it suitably decrease undesirable warm-up times, when less food capacity is acceptable, or it suitably conveys other benefits.

In operation, cooking vessel 176 is suitably lowered into outer enclosure 172, making possible energization of heat coil 178 by coupling coil terminal contacts 194 and 196 mating with contact receptacles 198 and 200 respectively.

Simultaneous with this, thermal sensor 175 moves up inside of tall aspect ratio (taller than it is wide) thermal sensor cover 190, resulting in thermal sensor 175, being directly proximate on its top and sides to oil contained within cooking vessel 176. This placement may advantageously help add accuracy and/or reduce response times for thermal sensor 175.

In addition, thermal sensor cover 190 is suitably constructed to have thin walls, and/or is suitably fabricated from aluminum, copper, or other thermally efficient conductive materials. Either or both of these also may advantageously improve thermal sensor 175 accuracy, and/or favorably reduce thermal sensor 175 response times.

Example Embodiment 226—FIGS. 12 Through 16:

FIGS. 12 through 16 show example embodiment 226.

Figure 14:
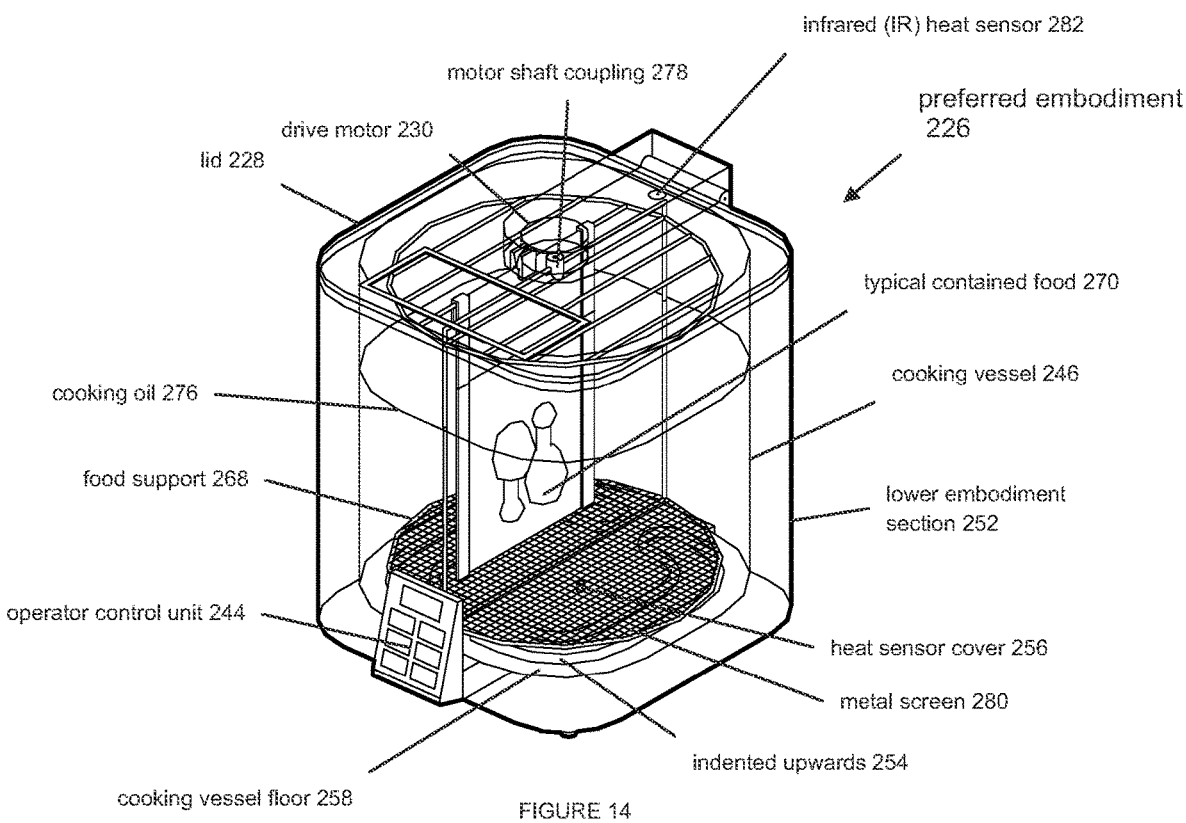
FIG. 14, is a perspective view of an example embodiment of food cooker with its forward facing walls, and its lid, made translucent for illustrative purposes.
Figure 16:
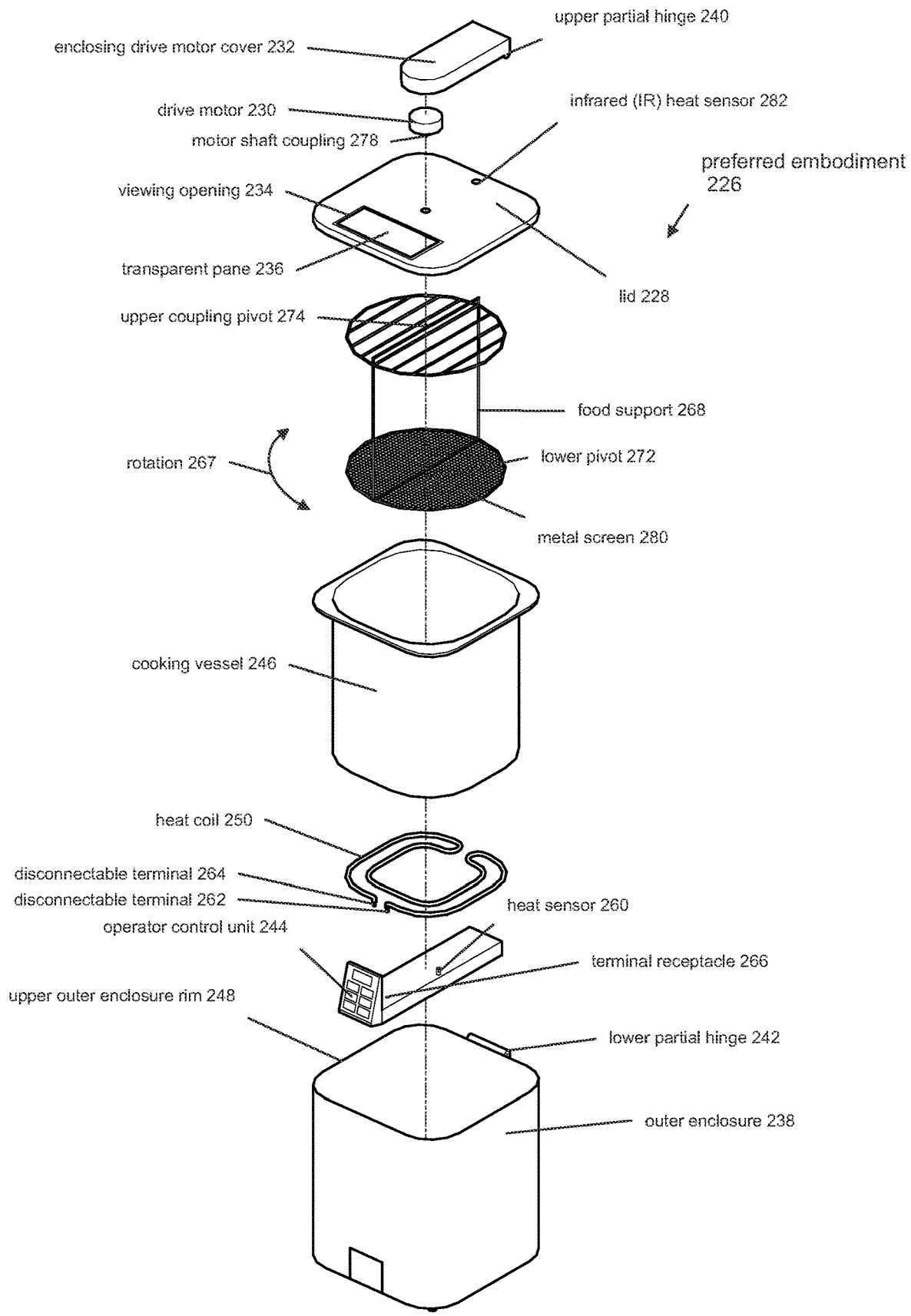
FIG. 16, is an exploded perspective view of an example embodiment of a food cooker.

Example embodiment 226 is comprised of: lid 228, which has drive motor 230, along with enclosing drive motor cover 232, mounted on its upper surface (FIGS. 14 and 16. In particular).

Lid 228 is also penetrated by viewing opening 234, which includes transparent pane 236.

Lid 228 is connected to outer enclosure 238 through the cooperation between upper partial hinge 240 and lower partial hinge 242. This cooperative configuration also allows electrical or other linkage between drive motor 230 (as well as potentially between other components directly or indirectly coupled to lid 228), and components directly or indirectly coupled to lower embodiment section 252, including, but not limited to, operator control unit 244.

Figure 12:
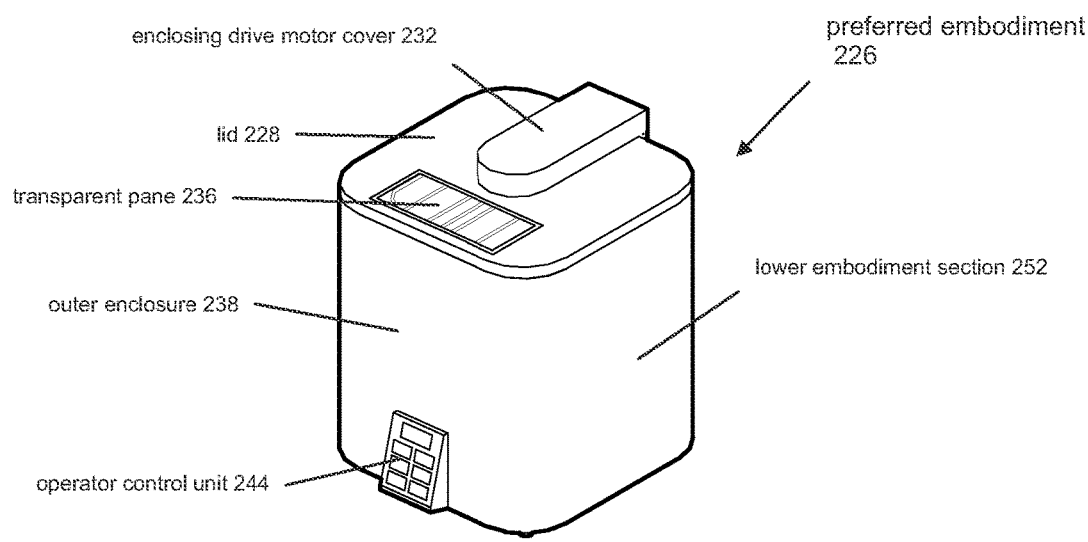
FIG. 12, is a perspective view of an example embodiment of a food cooker.

From time to time, lid 228, in its down position, suitably covers cooking vessel 246, as shown in FIG. 12. Cooking vessel 246 is configured to fit within outer enclosure 238, and to rest against upper outer enclosure rim 248 (FIG. 16 in particular).

Heat coil 250 is indented upwards 254 (FIG. 14) into, and protrudes above, cooking vessel floor 258 (FIG. 14).

Also protruding above cooking vessel floor 258, is tall aspect ratio (taller than it is wide) heat sensor cover 256, which, from time to time, when cooking vessel 246 is fully mounted within outer enclosure 238, houses heat sensor 260.

Heat sensor 260 is suitably, although need not necessarily be, spring-loaded upward to facilitate proper insertion into heat sensor cover 256, when cooking vessel 246 is lowered into outer enclosure 238.

Heat coil 250 is abutted on a first end by disconnectable terminal 262, and on its other end by disconnectable terminal 264. When cooking vessel 246 is lowered into outer enclosure 738, these mate, respectively, with terminal receptacle 266 (particularly FIG. 16), and a second terminal receptacle, which is not illustrated.

Figure 15:
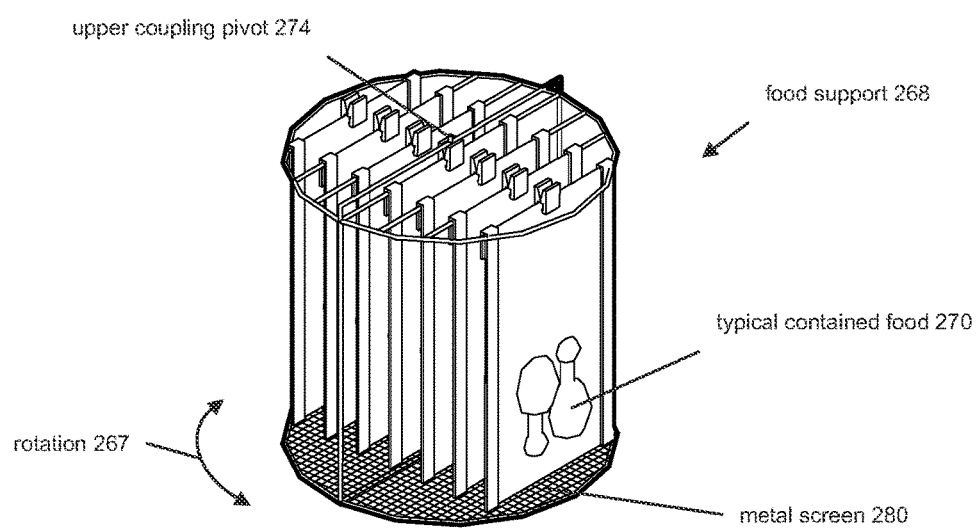
FIG. 15 is a perspective of an example embodiment of a food support.

Food support 268 is suitably constructed from plated metal rod and screen. FIGS. 14 and 15 illustrate an example embodiment of how food support 268 might hold typical contained food 270 during food preparation.

Figure 13:
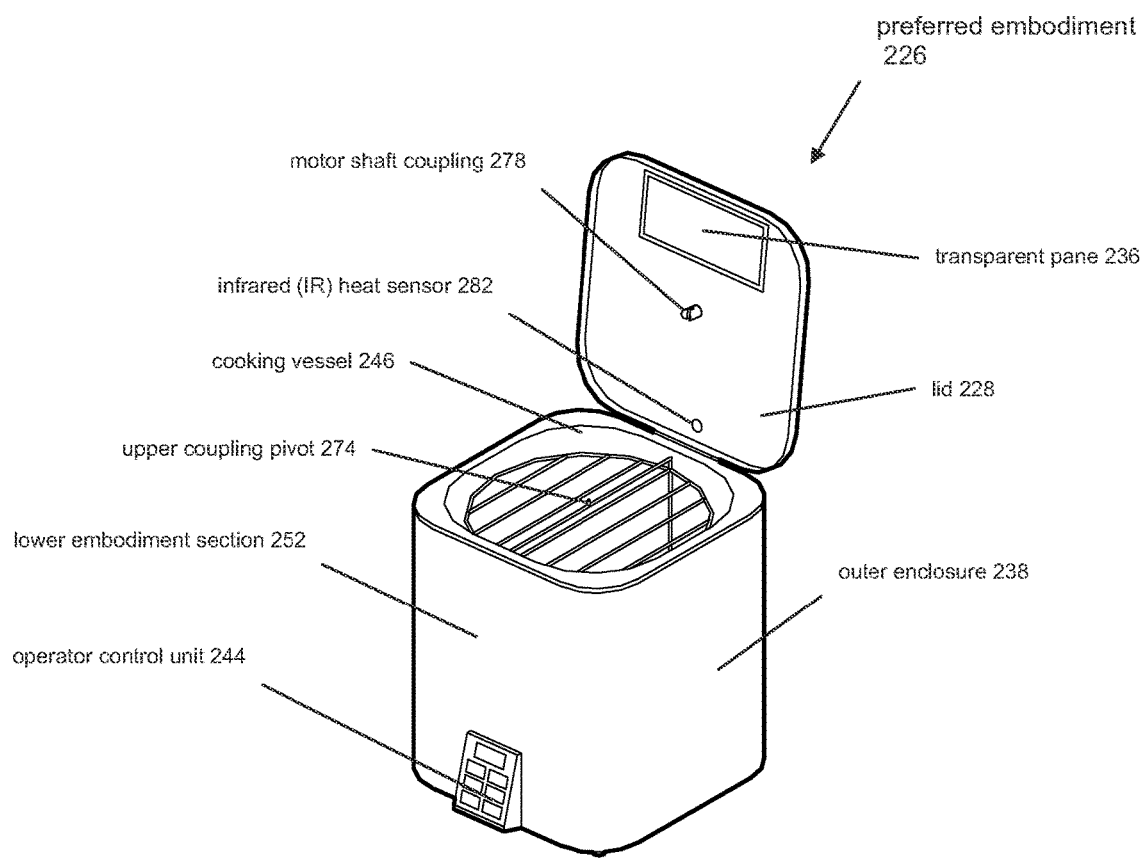
FIG. 13, is a perspective view of an example embodiment of a food cooker with an open lid.

Food support 268 includes lower pivot 272, and upper coupling pivot 274 (FIGS. 13 and 16 in particular).

In operation, cooking vessel 246 is placed into outer enclosure 238, which causes heat sensor 260 to be inserted up into heat sensor cover 256, and simultaneously causes disconnect able heat coil terminals 262 and 264 to couple with the terminal receptacles, including terminal receptacle 268.

Typical contained food 270 is then suitably mounted onto food support 268 (FIG. 15 as an example embodiment). An appropriate amount of cooking oil is suitably poured into cooking vessel 246, and heated, possibly under control from operator control unit 244.

Loaded food support 268 (as an example embodiment, FIG. 15) is suitably lowered into oil 276 contained within cooking vessel 246. This causes food support lower pivot 272 to rest into a conical, downward converging projection (not shown), which is disposed at or near the center of cooking vessel floor 258.

Lid 228 is then lowered (FIG. 12), which causes downward facing motor shaft coupling 278 to engage upper coupling pivot 274, located at or near the middle of the top of food support 268, resulting in rotational 267 linkage between drive motor 230 and food support 268 disposed around a vertical axis defined by lower pivot 272 with upper coupling pivot 274.

Operator control unit 244 is suitably then user directed for appropriate example embodiment 226 food preparation times and/or temperatures.

Drive motor 230 is suitably a gear reduced motor, such as a gear reduced: synchronous, or a twin poll induction, or a "C" frame induction motor, and advantageously rotates food support 268 at speeds between 2 RPM and 20 RPM, or at higher or lower speeds. Or drive motor 230 is suitably of other construction.

Rotation 267 of food support 268 helps circulate oil relative to food being prepared, thus potentially reducing food preparation times, and potentially enhancing even cooking heat distribution. This may occur during either low temperature or during high temperature food preparation, or at other times.

Alternatively, instead of full food support 268 rotation, food support 268 suitably oscillates between rotating food being prepared clockwise and then alternately rotating it counterclockwise.

Optionally, rotation, 267 is suitably turned off for certain embodiment operations.

Either fully rotational or oscillating rotational motion is suitably able to be viewed, such as through transparent pane 238. This suitably enhances perceived value for example embodiment 226, by potential buyers.

Such food support 268 and rotation 267 suitably also lowers cooking times by transporting heat more rapidly into typical contained foods 270 during food preparation This increased thermal transfer efficiency is analogous to what happens in forced air convection ovens, where moving hot air against food facilitates significantly lower oven cooking times. However, because foods are wrapped in example embodiments, they may not dry out, unlike such convection ovens.

Such typical contained food 270 motion within low temperature, as well as high temperature cooking oil, as mentioned earlier, may, by creating turbulence, desirably also make cooking temperatures within cooking vessel 246 more even.

Metal screen 280 suitably helps prevent typical contained food 270 from coming too close to indented 254 heat coil 250, and thus may help prevent food exposure to potential bounded; anomalously excessive, cooking oil temperatures.

Infrared (IR) heat sensor 282 (FIGS. 13,14 and 16) is similar to sensors used on inexpensive, widely sold, digital display, portable thermometers, and sensor 282 is suitably used as an alternative to, or to augment, heat sensor 260. From its position within enclosing drive motor cover 232 (FIG. 14), when lid 228 is lowered, sensor 282 is aimed downward, and detects the temperature of oil contained within cooking vessel 246. Heat sensor 282 is also suitably used for displaying cooking temperatures.

Infrared (IR) sensor 282 and heat sensor 260 are suitably used independently, or together. And either is suitably used to thermostatically control, or to thermally limit temperatures of the contents of cooking vessel 246, or for simple temperature detection/display, or for other purposes. Also, either one of them, or both of them, is suitably preset, or suitably allows user directed input.

Embodiments using present example embodiments during low or high temperature food preparation steps suitably terminate the preparation process, simply by turning off the heat source for the oil. Generally, there is no need to immediately remove the food from the oil directly after cooking has terminated.

This advantageously provides a major convenience. As an example embodiment, a switching timer, or programmed electronic circuit might be used to control, also as an example embodiment, heat coil 250. A user suitably sets this control so that cooking (i.e., electrically energizing, as an example, heat coil 250) takes place for an example cooking time of, say, five hours at, say, an example low temperature setting, after which it is then turned off. If the user does not return at that point, but rather returns minutes or even several hours later, this may facilitate very satisfactory cooking results, even when compared to removing the food from the oil directly after the five-hour example cooking time.

Foods generally do not have to be immediately removed from cooking oil directly after either high temperature, or low temperature food preparation.

Also, as an example embodiment, power consumption input into the cooking fluid (i.e. oil) contained within cooking vessel 246 for lower temperature cooking processes is suitably half or less of that used for higher temperature cooking processes.

As a specific non-limiting and non-exhaustive illustrative example of this, heat coil 250 suitably utilizes 1700 watts of energy for higher temperature cooking processes, and yet may use only 60 watts of energy, or less, for lower temperature cooking processes.

As disclosed earlier, this facilitates keeping cooking temperatures more even, particularly at low cooking temperatures, by cutting down on high temperature spikes from a too-powerful heat source.

Also as an example embodiments of alternative constructions, heat coils 178 and 250 might use other constructions, such as mat-type heaters (some of which use silicone rubber foundations), or plate-type heaters (some of which use glass as a foundation), or other constructions, either to replace or augment heat coils 178 and 250. Such heater constructions may facilitate more uniform heating by spreading heat introduction over a larger surface area.

The examples given herein have defined high temperature cooking processes as occurring above boiling. It has further been found advantageous, under certain circumstances, to use temperatures above 250° F.

The examples given herein have defined high temperature cooking processes as occurring above boiling, but with no upper limit. It has further been found advantageous, under certain circumstances, to use temperatures below 400° F. Such an upper limit is below the smoke point of many commonly used cooking oils. Also, this may fall below the upper temperature limits used in the standards followed by many US and foreign safety testing laboratories.

The examples given herein have defined low temperature cooking processes as occurring below boiling. It has further been found advantageous, under certain circumstances, to use temperatures below 190° F. Such a temperature limitation accommodates most sous vide cooking recipes.

Referring to FIG. 1, steps 1 through 5 (without re-immersing 124), is suitably performed independently to accomplish sous vide-like cooking results, but using present example embodiment cooking oil to replace sous vide cooking water.

Parenthetical figure references "(figure reference)" within this document are intended to help the reader locate specific figure locations where the referenced circumstances might be found. These parenthetical figure references do not necessarily represent an exhaustive list. Other locations, both within the figures, as well as possibly elsewhere, including, but not limited, to descriptions within this written specification, as well as references in the accompanying information disclosure statement might also be relevant.

With proper engineering of components, both example embodiment 170, as well as example embodiment 226 as described herein, with minor or no modification are suitably used for: deep frying, or boiling, or steaming, or traditional water bath sous vide food preparation. Therefore, embodiment 170, as well as embodiment 226 have the inherent potential of being multi-cookers (devices promoted as having multiple cooking functions), or the potential to be used independently for any of the above functions.

Embodiment 1300 includes cooking chamber 1312, which is formed by floor 1314, supporting sidewalls 1316, which are capped by heater/fan/control housing 1318 (referring at least to FIGS. 17, 19, 20, 21, and 34).

Controls 1302 on heater/fan/control housing 1318 accept user inputs, as a non-limiting and non-exhaustive example, which include at least the projected food serving time, and a description of food being cooked.

As a first non-limiting and non-exhaustive example, to use embodiment 1300, food 1326, in this specific example, 3 bone-in chicken legs, is wrapped (FIGS. 22 through 28) in heat transmissive, malleable containment skins 1304, and loaded into cooking chamber 1312 (FIG. 17), and the projected food serving time 1320 of 6:30 PM and the food type 1322 "028" are inputted using buttons 1328. In this specific example, food type 1322 is inputted as a three digit numeral, which is found, as non-limiting and non-exhaustive examples, on a food type code lookup table, such as is illustrated in FIG. 35, or on an iPhone app, or found using other means.

Pressing start button 1324 then commences the cooking process.

Embodiment 1300 is configured to calculate all cooking conditions, including at least cooking heat(s), and time(s). It may also optionally calculate other things such as the amount of air circulated by the fan, and/or additional heating such as non-limiting and non-exhaustive examples, by microwave or infrared, etc. The initiation of each food preparation process is calculated based on how long the process will take to do each cooking process, worked backward from the projected food serving time 1320.

Medium browning the food at 350° F. takes 15 minutes, and may occur before, during, or after sous vide and/or other cooking.

Temperatures above boiling are generally needed to color food exteriors. Most foods require more than 300° F. of food cooking heat. Searing of meats, such as steaks and ribs, generally requires quickly applied heat which is typically above 350° F.

Sous vide cooking will take between 4 and 8 hours.

Sous vide cooking will thus automatically start at 2:15 PM (6:30 PM serving time, less 4 hours of sous vide cooking time, less 15 minutes of browning=(2:15 PM)).

Excellent quality food may be served at any time during sous vide cooking, and, when warmed to serving temperatures, the user may serve excellent quality food up to several hours thereafter.

As another, separate, non-limiting and non-exhaustive example, let's say at 7:30 AM, the user puts wrapped food 1326 into cooking chamber 1312 and appropriately sets controls 1302 for a projected food serving time of 6:30 PM and a food type code of 027 which is all taken from the food type code chart shown in FIG. 35.

As soon as the user presses start button 1324 at 7:30 AM, embodiment 1300 immediately browns the refrigerator temperature food at 350° F. for 15 minutes, ending at 7:45 AM.

Browning the food while it is still refrigerator cool, allows higher browning surface temperatures with minimal raising of internal food temperatures.

After this 15 minutes of browning, 30 minutes of sous vide cooking follows, thus ensuring that the food is fully pasteurized. This pasteurization helps keep food from spoiling, even if it is left for several hours without being fully cooked. This, as a non-limiting and non-exhaustive example, allows setting up the cooking in the morning, and coming back in the evening and having food fresh cooked.

Power to electric heat rods 1376 (at least FIGS. 19 and 20) is then cut off until the re-commencement of sous vide cooking at 4:30 PM (6:30 PM serving time, less 2 hours of remaining sous vide cooking time).

At this time cumulatively, 15 minutes of browning, and the minimum 4 hours of sous vide cooking has occurred, resulting in the food being medium browned and fully sous vide cooked at projected food serving time 6:30 PM.

Because sous vide cooking allows up to 4 hours of cooking time (a minimum of 4 hours up to a maximum 8 hours), food may be served perfectly sous vide cooked between 6:30 PM and 10:30 PM.

By keeping the food warm to a serving temperature of, as a non-limiting and non-exhaustive example, between 95° F. and 125° F., well-cooked sous vide food can be served for several hours after 10:30 PM.

If the food is not removed within a predetermined amount of time, all power to electric heat rods 1376 may be shut off.

Temperatures and times used in sous vide cooking are well-known and amply published, as are separately, the temperatures needed to color the outside of various foods.

In part because containment skins 1304 may be opened and closed at any time, before, during, or after, sous vide cooking, other food preparation steps may occur at any time. These may include, as non-limiting and non-exhaustive examples, adding seasoning or flavorings, and/or adding other ingredients, and/or performing additional food preparation steps. These steps may be programmed into embodiment 1300 to automatically occur.

In this particular example, all the user set up, including wrapping and loading food into cooking chamber 1312, and at least inputted settings of serving time 1320, and food type description 1322 (FIG. 35); may be made hours in advance of the sous vide cooking commencing. This is a major convenience, especially when compared traditional sous vide cooking which requires user presence during each stage of the sous vide cooking process (i.e. at least during bagging and vacuum sealing food, and during food loading, and later to brown the food using a frypan or other means, and finally when food is unloaded and served).

As a non-limiting and non-exhaustive example, before leaving for work in the morning, a user may load and set controls 1302 on embodiment 1300. A user may then come back at mealtime to find the food perfectly cooked, at the perfect serving temperature, and ready to serve, with no other processing and no intermediate steps required.

Controls 1302, as a non-limiting and non-exhaustive example, may also include user input 1330 to pause or stop the cooking process at any time, including at least during the sous vide cooking, reheating of foods, and browning cooking processes.

Browning input button 1332 allows the user to adjust the amount of browning, as indicated by lights 1334.

Reheat button 1336 allows a user to reheat, within cooking chamber 1312, as non-limiting and non-exhaustive examples, room temperature, or refrigerated, or frozen, or other temperature foods. When reheat button 1336 is pressed, lights 1340 sequentially illuminate to indicate the amount of reheating which will occur.

Control buttons 1342 and 1344 allow the user to percentage increase or decrease, the amount of cooking which will occur.

So, as a non-limiting and non-exhaustive example, if a user thinks that an article of food is excessively frozen or is unusually thick, they can adjust cooking time 1346 up by a positive percentage (%) amount.

Adjustable clock 1348 allows embodiment 1300 to be standard time synchronized by a user, at least so serving time 1320 is accurate according to local time.

Ready light 1350 goes on whenever food being cooked is ready to be removed from cooking chamber 1312 and served. So, as a non-limiting and non-exhaustive example, if the food is first ready to be served at 6:30 PM, and, with warming serving temperatures thereafter, the warming terminates at 12:30 AM; ready light 350 will be continuously on from 6:30 PM through 12:30 AM.

Operating light 1352 goes on whenever embodiment 1300 is turned on 1324.

Figure 34:
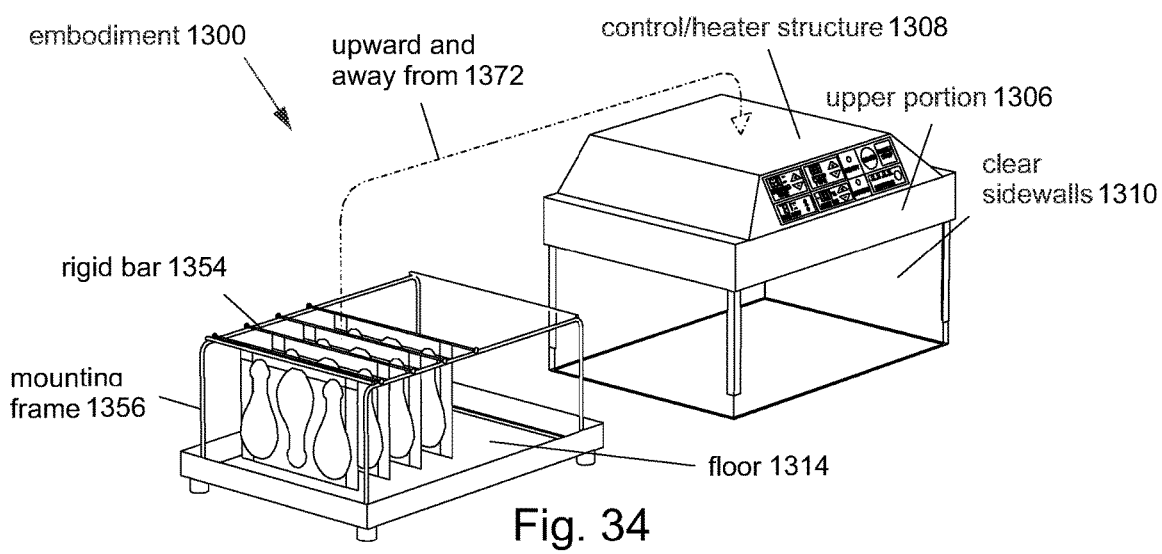
FIG. 34 is a perspective of embodiment 1300 with upper portion 1306 removed. Upper portion 1306 includes control/heater structure 1308 with mounted components, and with attached downwardly projecting clear sidewalls 1310.

Referring at least to FIGS. 17, 19, 20, 21, and 34, embodiment 1300 includes: floor 1314 which from time to time supports clear sidewalls 1316, with sidewalls 1316 being removably attached to control/heater structure 1308 (FIG. 34). Floor 1314 in turn is configured to also support foods being cooked. Food may be mounted within cooking chamber 1312 in any useful manner.

Figures 28, 29:
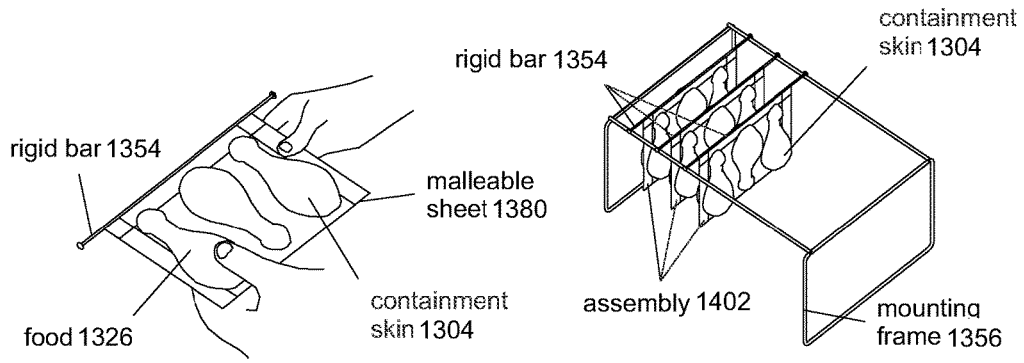
FIGS. 29 through 33 are perspectives which show various ways of mounting one or a plurality of containment skin(s) 1304 while they contain food.

As a non-limiting and non-exhaustive example, before cooking, food 1326 may be wrapped in a heat transmissive, malleable, formed sheet 1380 (as a non-limiting and non-exhaustive example, formed aluminum foil), as shown in FIGS. 22 through 28. FIG. 28 shows how such a malleable sheet, possibly aluminum foil or other suitable material, might be manually formed to match outer contours of food 1326 by pressing on the outer surfaces (FIG. 28) of the malleable sheet 1380 causing the surfaces to form face to face contact with food 1326.

Face to face contact allows efficient heat transfer through the use of conduction.

This formed construction in embodiment 1300 of malleable containment skins 1304 to mechanically conform to face-to-face contact against outer surfaces of food 1326, is characteristically different than traditional sous vide cooking, which relies on evacuation of plastic bags, to force the bags into face-to-face contact with food 1326 which is being sous vide cooked. In the real world, this means that containment skins 1304 in embodiment 1300 retain their formed shape, even if food 326 is removed, whereas in traditional sous vide cooking, the flexible plastic food containment bags collapse without the presence of contained food.

This malleable outer skin construction in embodiment 1300, in turn, means that embodiment 1300 does not need expensive vacuum bag sealing equipment to vacuum seal outer skins against outer surfaces of food being cooked.

Expensive vacuum bag sealing equipment has long been recognized as a significant shortcoming of traditional sous vide cooking.

It also means that embodiment 1300 does not require the use of expensive vacuum sealed bags, as in traditional sous vide cooking.

This has also been a recognized, long-standing shortcoming of traditional sous vide cooking.

As a non-limiting and non-exhaustive example of materials which might be used, malleable containment skins 1304 may be constructed using aluminum or other metal foils, or other thermally transmissive malleable sheet.

To ensure food safety, a food-contact-safe coating may be used on at least the one surface of the foil which contacts the food being cooked.

And because foods being cooked may stick to inner container surfaces, the food-contact-safe coating just described may have nonstick characteristics.

Figure 17:
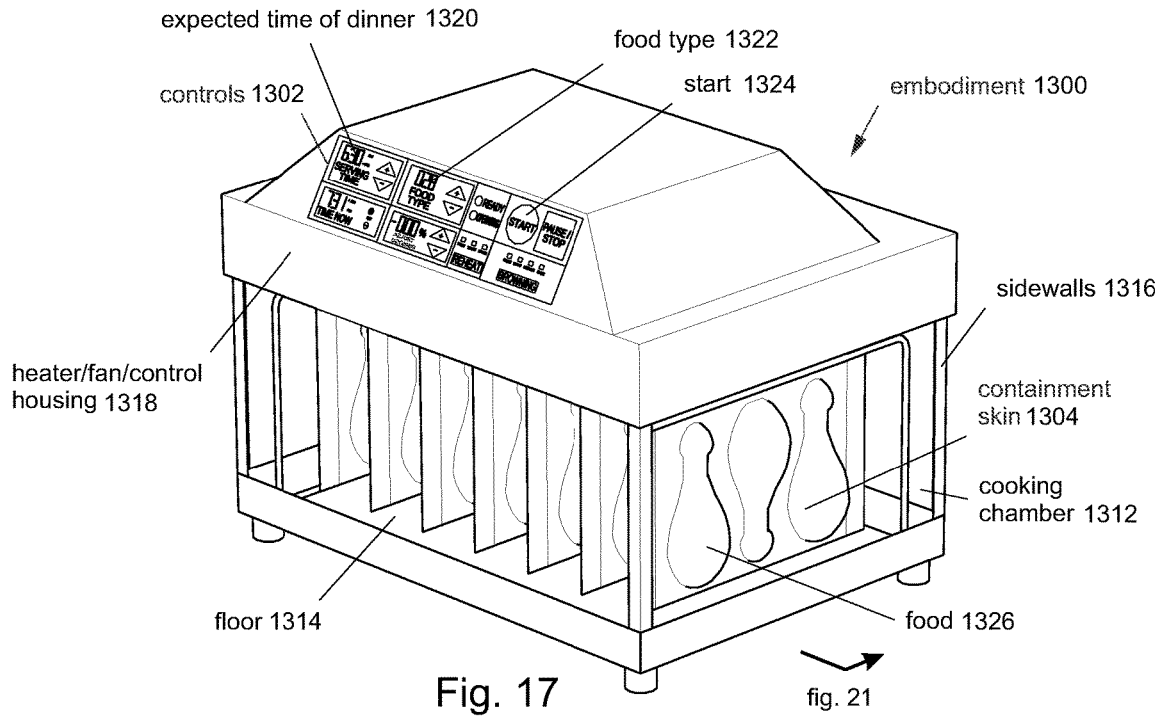
FIG. 17 shows a frontal perspective of embodiment 1300.
Figure 18:
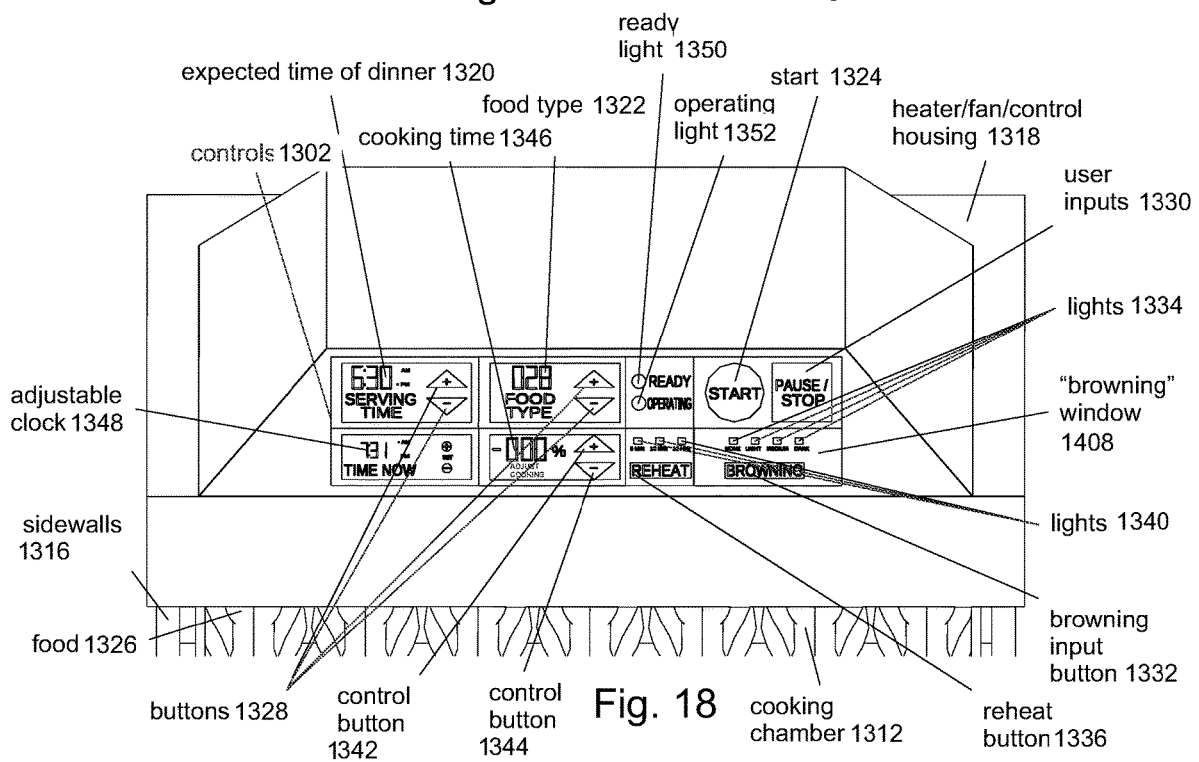
FIG. 18 is a head-on view of controls 1302.

As shown at least in FIGS. 17, 29 and 34, using rigid bar 1354, which is attached at the top of wrapped food 1326, may allow wrapped food 1326 to be suspended from mounting frame 1356. Mounting frame 1356 may be placed within cooking chamber 1312 by resting it on floor 1314 and placing sidewalls 1310, and attached control/heater structure 1308, on top of floor 1314 (at least FIGS. 17, 29 and 34).

Mounting frame 1356 allows food 1326 to be freely suspended in cooking temperature air within cooking chamber 1312. This may facilitate rapid and even cooking.

Other food mounting constructions may be used, at least some of which are published and well-known.

Figure 30:
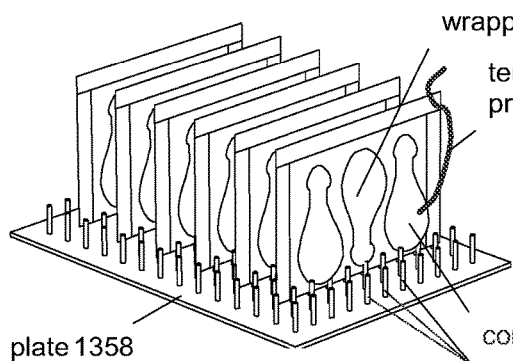
Figure 31:
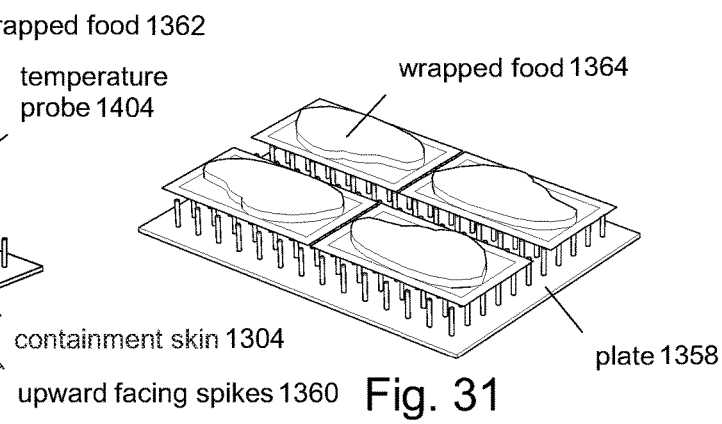

FIGS. 30 and 31, show non-limiting and non-exhaustive examples of other ways to mount food 1314 within cooking chamber 1312. Here, plate 1358, including, integral upward spikes 1360, is placed on top of floor 1314, in a manner similar to mounting frame 1356.

As shown in FIGS. 30 and 31, wrapped foods 1362 and 1364 may be rested in any useful manner on the upper ends of spikes 1360. During cooking, spikes 1360 provide even airflow around foods 1362 and 1364. This in turn may make cooking faster and more even.

Figure 32:
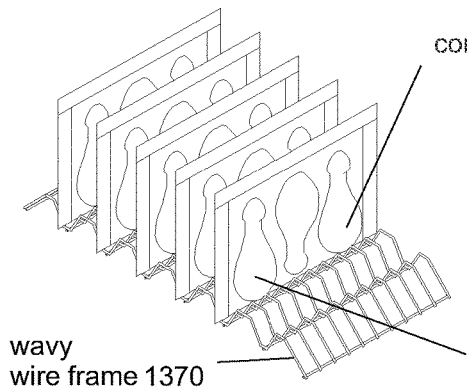
Figure 33:
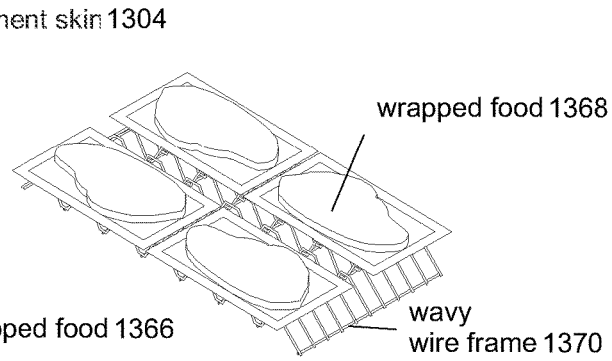

As yet another non-limiting and non-exhaustive example of how foods might be mounted within cooking chamber 1312, FIGS. 32 and 33 show how wrapped foods 1366 and 1368 might rest, in any useful disposition, on top of wavy wire frame 1370. Once again, air is free to circulate around foods 1366 and 1368, thus promoting fast even cooking.

FIG. 34 shows a non-limiting and non-exhaustive example of one way to access cooking chamber 1312 for food loading, cleaning, or for other purposes. In this example, sidewalls 1310 and coupled control/heater structure 1308, are removed from floor 1314, by lifting 1372 them upward and away from floor 1314.

Other useful access door constructions are well-known, including, but not limited to, swinging an access door sideways, or downward, or upward, or providing an access opening using any other suitable means.

Figures 19, 20:
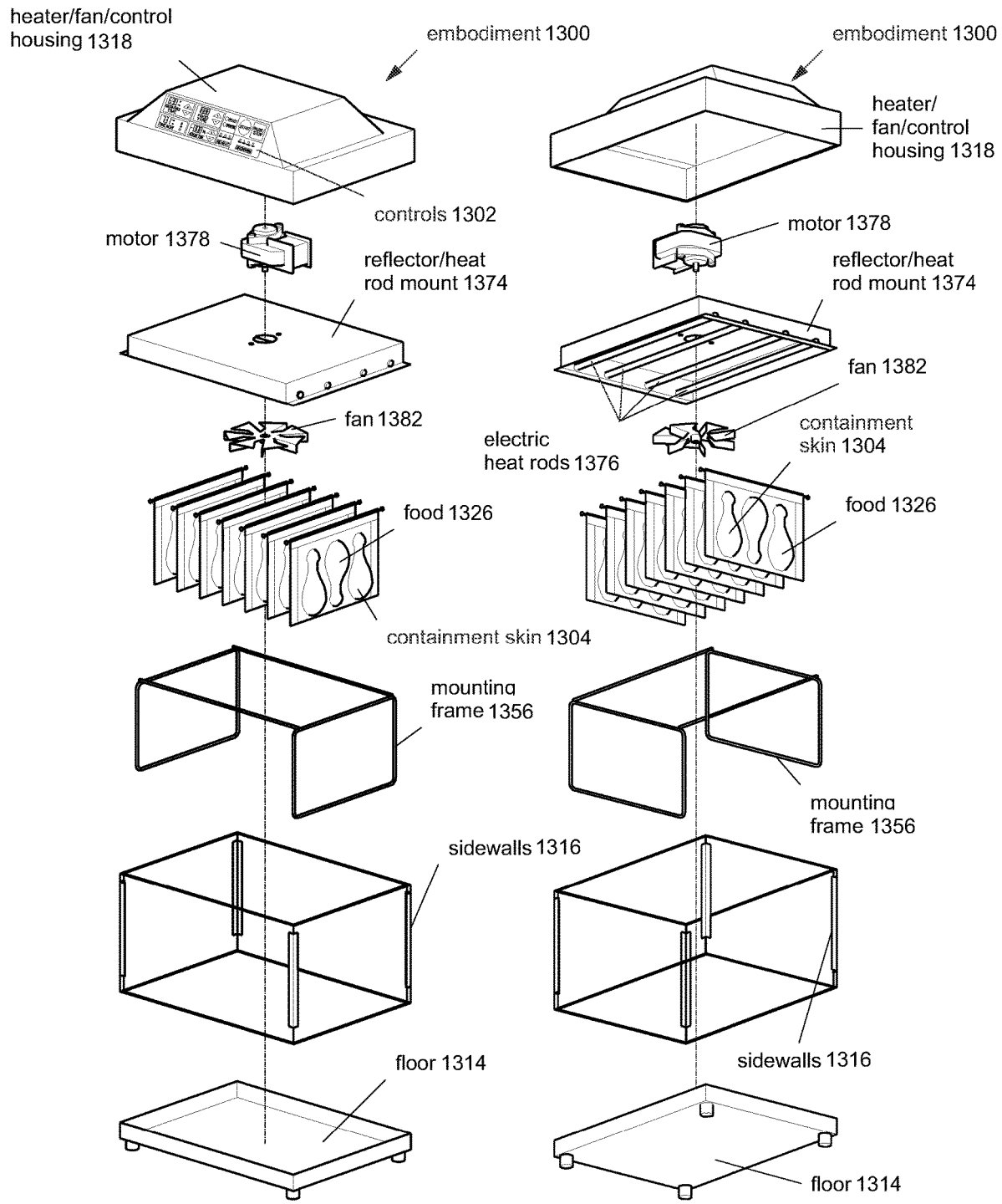
FIG. 19 is an exploded perspective view of embodiment 1300 when viewed from in front and above.
FIG. 20 is an exploded perspective view of embodiment 1300 when viewed from below and behind.

FIGS. 19 and 20 show perspective exploded views of embodiment 1300. Here, heater/fan/control housing 1318 mounts both controls 1302 and reflector/heat rod mount 1374. Reflector/heat rod mount 1374 in turn holds heat rods 1376 and motor 1378. Motor 1378 is coupled to, and powers, fan 1382. Heater/fan/control housing 1318, including mounted components, rests on top of sidewalls 1316, which may be constructed from glass or plastic or other suitable material.

Sidewalls 1316 in turn may rest on top of, and may be lifted off from, floor 1314 (FIG. 34).

As non-limiting and non-exhaustive examples, in operation, motor 1378 driven fan 1382, in cooperation with controls 1302, and electric heat rods 1376, circulates thermostatically controlled air throughout cooking chamber 1312. This heated, air movement during sous vide cooking is precisely controlled, as a non-limiting and non-exhaustive example, to match water temperatures in conventional sous vide cooking. This hot air also may be controlled to match temperatures suitable for coloring outer surfaces of food during browning portions (if used) of embodiment 1300 cooking.

Embodiment 1300 may be multi-functional by additionally offering: bake oven cooking, and/or air frying, and/or convection oven cooking, and/or food dehydration, and/or broiling, and/or combinations and permutations of the just mentioned, as well as other useful cooking functions.

Heat rods 1376 are activated, by controls 1302. As a non-limiting and non-exhaustive example, controls 1302 may switch heat rods 1376 on and off, and control how much power heat rods 1376 receive. Controls 1302 may also control when fan 1382 turns on and off, and its rotational speed.

When compared to the water-filled cooking vessels of traditional sous vide cooking, heating the wrapped food contents of cooking chamber 1312 using fan driven hot air allows: much faster cooking chamber warm-up, quick and even heat transfer to the foods being cooked, accurately controlled cooking heat, as well as quick high temperatures food browning.

As a non-limiting and non-exhaustive example, during sous vide cooking, embodiment 1300, when activated, may at first use high power delivered to power heat rods 1376 to quickly heat cooking chamber 1312 to sous vide temperatures. This may be followed by much lower power settings to heat rods 1376 as sous vide cooking progresses. Such power consumption modulation may help even out sous vide cooking temperatures by gently just nudging sous vide cooking temperatures up and down, rather than rapidly elevating the temperatures using a powerful heater.

Embodiment 1300 may be constructed using techniques and materials such as are found, as a non-limiting and non-exhaustive example, in typical kitchen ovens.

Embodiment 1300 is capable of cooking virtually all, if not all, foods that can be prepared using traditional water sous vide.

As yet another non-limiting and non-exhaustive example of an embodiment 1300 work session, a user might take 3 bone in chicken legs (food 1326 in FIG. 22) out of the refrigerator and place them on a sheet of aluminum foil, possibly having, on one side, a nonstick and food safe coding (malleable sheet 1380 in FIG. 22) with the coated side of the foil facing the food.

Referring to FIGS. 22 through 28, the user might then fold sheet 1380 in half 1384 (FIG. 22) and then fold over 1385 outer edges 1386. Next, referring to FIG. 24, folded edges 1388 might be folded over 1390 yet again.

Figures 24, 25:
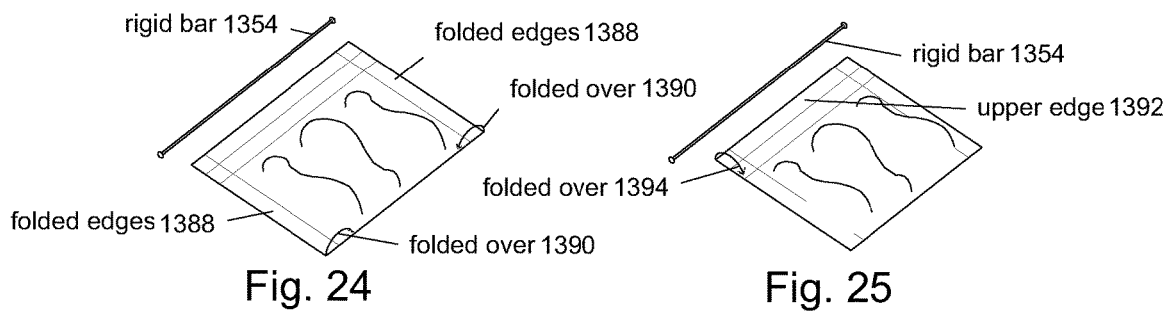
Figures 26, 27:
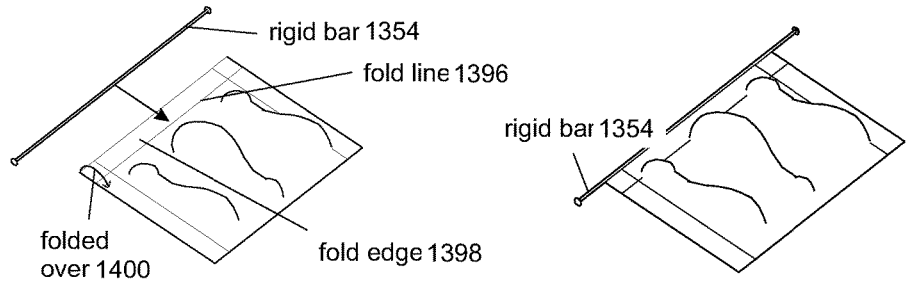

Next, referring to FIGS. 25 through 27, upper edge 1392 may be folded over 1394 and then rigid bar 1354 placed along fold line 1396.

Next, fold edge 1398 is folded over 1400 thus structurally trapping rigid bar 1354 along fold line 1396 (FIG. 28).

Venting of containment skins 1304, as non-limiting and non-exhaustive examples, may be accomplished by not completely crimping one or more of the fold seams. It may also be done by perforating containment skins 304 with one or more vent holes. Some venting of containment skins 1304 may be necessary at least to prevent water vapor, and/or steam from pushing containment skins 304 away from face-to-face contact with food 1326, consequently at least impeding cooking heat transfer.

In FIG. 28, malleable sheet 1380 is manually pressed to conform to the outer surfaces of food 1326.

FIG. 29 shows a plurality of assembly 1402's just described, suspended from mounting frame 1356.

Figure 21:
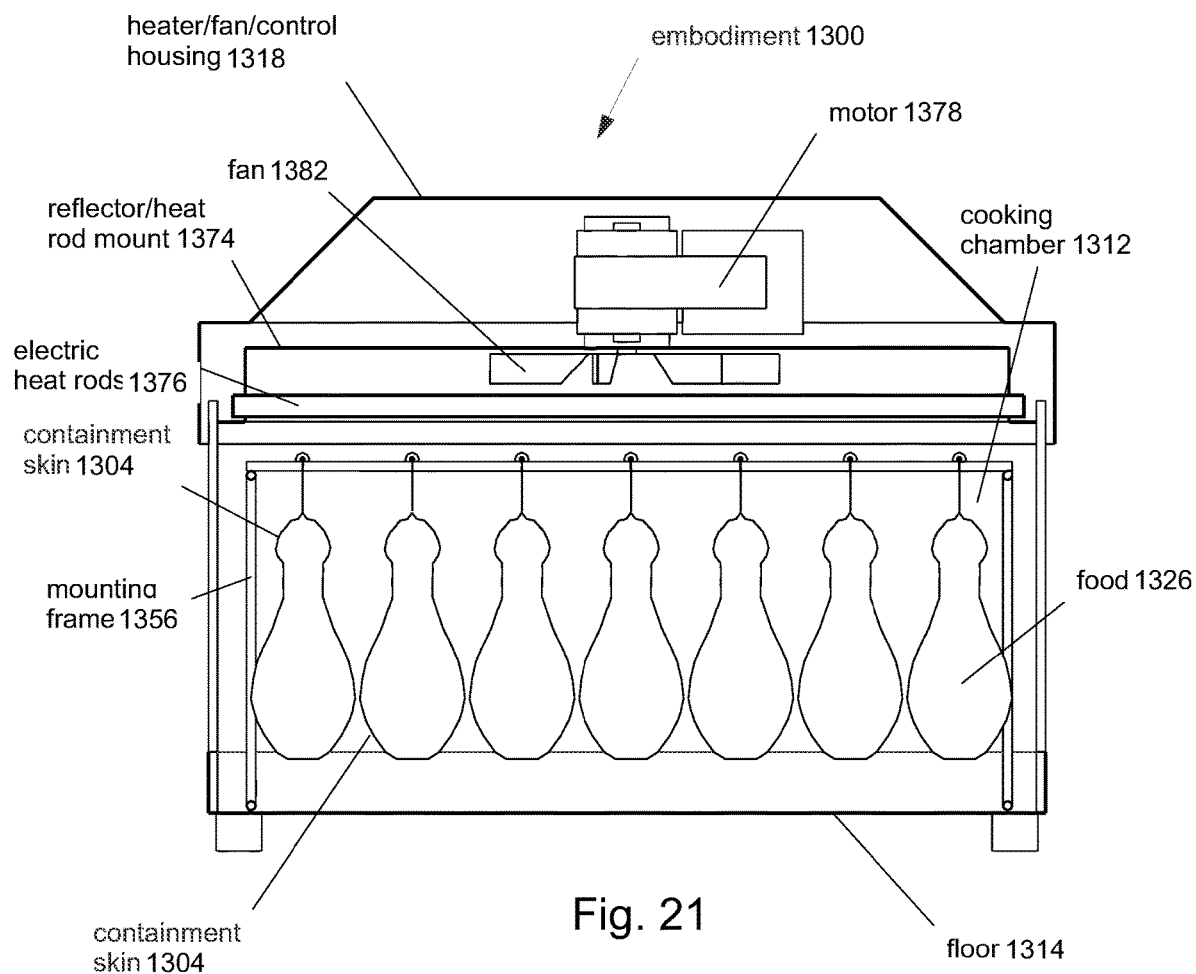
FIG. 21 is a section taken through embodiment 1300, as indicated in FIG. 17.
Figures 22, 23:
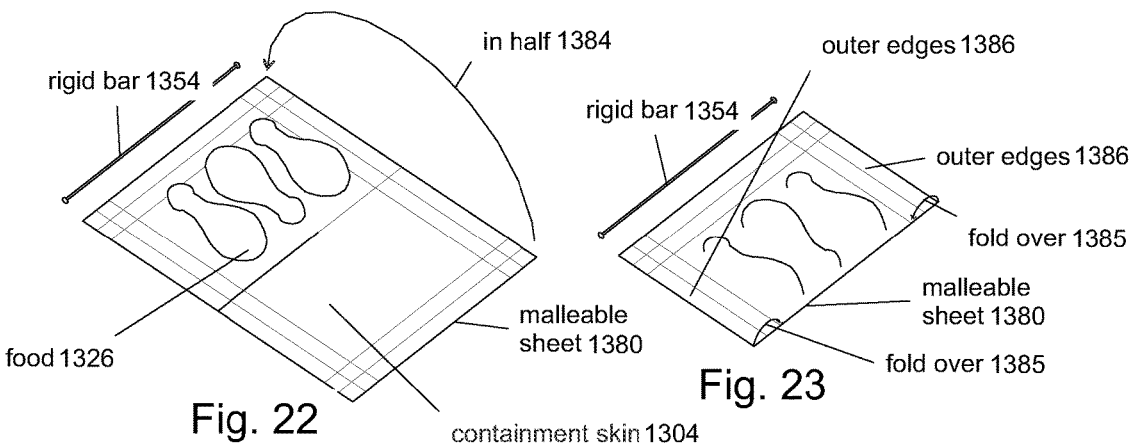
FIGS. 22 through 28 are perspectives of the assembly of containment skin 1304.

FIGS. 17, 21, and 34 show how mounting frame 356 may be placed inside cooking chamber 1312 by resting it on floor 1314.

Likewise, in a similar manner, the food mounting devices shown in FIGS. 30 through 33, may also be placed inside cooking chamber 1312, by resting them on floor 1314. Alternatively, conventional oven racks, with multiple parallel spaced wires, may be rested above floor 1314 to support foods being cooked.

Next, the user sets controls 1302 as previously described.

Food heat coloring, at this time, if desirable, is set by repeatedly pressing browning input button 1332.

Start button 1324 is then pressed, and the user may leave embodiment 1300 until the designated dining hour when cooking is completed, and the food is ready to be served.

By using fan driven heated air to sous vide cook food instead of heated water used in conventional sous vide cooking, it is much easier to quickly vary cooking temperatures throughout the sous vide process. Using programmed and/or oscillating temperature variances throughout the sous vide cooking cycle, creates the opportunity for many new cooking environments, which in turn offers a wider variety of prepared food outcomes.

Using fan driven heated air to cook foods allows cooking temperatures greater than boiling. This contrasts with traditional sous vide cooking, where temperatures above boiling would cause the heated water used to cook, to boil and evaporate. Such higher temperatures may at least be desirable to thermally color exterior food surfaces during some part of the cooking process.

Also, embodiment 1300, by wrapping foods using high temperature tolerant material like, as a non-limiting and non-exhaustive example, malleable metal foil, allows high temperature surface browning of foods being cooked. This contrast with the plastic bags used to wrap food in traditional sous vide cooking, which melt and out gas at high temperatures.

Using fan driven heated air to sous vide cook also eliminates filling, emptying and handling of heavy water-filled vessels as are commonly used in traditional sous vide cooking. This in turn makes embodiment 1300 much more convenient and easy to use when compared with using traditional sous vide apparatus.

Using formed food containment wrappers fabricated from malleable, thermally transmissive materials allows opening and closing of the containment wrappers before, during, and/or after food cooking, such as, as a non-limiting and non-exhaustive example, to add or remove ingredients, or manipulate foods, or perform other culinary procedures during cooking. Such food containment wrappers also allow, without their removal: refrigeration, freezing, heating, and reheating of foods contained within the wrappers. Such wrappers also may be used without removal, or additional enclosure, to store leftovers, or for longer term freezer storage, or for other reasons.

When there is a substantial duration, as a non-limiting and non-exhaustive example of perhaps several hours, between when a user first turns on embodiment 1300 and when the food in embodiment 1300 is served, during this period, microbial growth and food spoilage for other reasons may occur.

As a non-limiting and non-exhaustive example, to help prevent food spoilage, when embodiment 1300 is first turned on, the temperature within cooking chamber 1312 may be raised to a temperature, and for a duration, sufficient to pasteurize the food being cooked. This may be at a sous vide cooking temperature, or it may be some other temperature or combination of temperatures.

During this pasteurization period, the food may be fully cooked, or partially cooked, or virtually not cooked it all.

After this, embodiment 1300 lowers its cooking chamber 1312 temperature to a point where cooking is greatly reduced or is terminated. This helps to prevent the food from being overcooked while it is waiting to be served and/or cooked.

Finally, the temperature within cooking chamber 1312 is raised to a temperature or temperatures to finish cooking the food. This may, or may not, include temperatures high enough to color outer surfaces of foods being cooked.

This may be at the sous vide cooking temperature, or a higher heat food coloring temperature, or the sous vide cooking temperature followed by the higher heat food coloring temperature; or some other useful temperature or sequence of temperatures.

Temperature probe 1404 (FIG. 30) connected to controls 1302 (FIG. 17) may help in more precisely controlling the sous vide cooking process by measuring actual internal food temperatures rather than relying simply on cooking times and temperatures. One or more such temperature probes may be used.

Herein, pasteurization refers to a process of partial or full sterilization involving heat treatment.

Ready light 1350, on controls 1302, in this example, would come be on starting at 6:00 PM, and would not turn off until 10:00 PM, indicating that food is ready to be served during this period.

This 4 hour perfect sous vide serving period (between 6 PM and 10 PM) may be expanded at least by adding low temperature (below 125° F.) heat to cooking chamber 1312 after sous vide cooking cuts off 10:00 PM, thus keeping the food at serving temperature for an indefinite or a specified period of time thereafter.

This method of first placing food inside a cooking device and then immediately heat pasteurizing it so that it won't spoil even if cooking commences hours later, is adaptable to many other cooking appliances including at least: traditional sous vide appliances, kitchen ovens, toaster ovens, countertop ovens, food steamers, pressure cookers, microwave ovens, electric grills, waffle irons, electric fry pans, roaster ovens in other food preparation devices.

Calculating when to start steps in a cooking program based on an inputted serving time and an input of the type of food being cooked, greatly simplifies setting up embodiment 1300, especially when comparing it to traditional sous vide.

What have been shown herein are several example embodiments. Many variations of the teachings herein will be obvious to those knowledgeable in the art, and as such, should be considered as part of the teachings herein; the breath of protections afforded such teachings being defined only by the limits established for the claims awarded to this application.

Embodiment 2000 is an embodiment of some of the present inventions. Its function is to sous vide cook foods. It differs from other forms of prior art sous vide cooking in several respects.

As both non-limiting and non-exhaustive examples, embodiment 2000 may use air instead of water, or other fluids, to transfer heat to wrapped foods to be sous vide cooked. Rapid air movement in embodiment 2000, may facilitate efficient heat transfer.

Embodiment 2000 precision thermal management, required for sous vide cooking, may use thermal reactive circuitry and/or other means similar found in current water immersion sous vide cookers, with little or no adaptation.

Likewise, embodiment 2000 may utilize trays with upright posts to support sous vide cooked foods to facilitate free air movement and even heat transfer around the entire outer parameters, including the bottoms, of foods being sous vide cooked.

Embodiment 2000 may, before, during, or after sous vide cooking, use one or more contained powered horizontal or vertical grill plates to affect outer surface thermal coloring on foods being sous vide cooked. This may include searing in linear or other configured grill marks. And it may include thermal coloring on one or more food surfaces, such as the tops, bottoms, sides, or other surfaces.

Embodiment 2000 may thermally color exterior surfaces of foods being sous vide cooked, by placing the foods directly over the grill plates described immediately above, as a non-limiting and non-exhaustive example, using a tray or shelf, and using radiant and/or convective and/or other heat to thermally color the foods' exterior surfaces.

Embodiment 2000 may utilize thermally transmissive, malleable, conformally formed to outer food surfaces, self-supporting, containers to envelop foods being sous vide cooked. This may contrast with collapsible, plastic, evacuated, machine heat sealed bags used in other methods of sous vide cooking.

Embodiment 2000 may utilize heat tolerant containers to envelop foods being sous vide cooked, so that the containers need not be unwrapped to thermally color outer food surfaces.

Embodiment 2000 may utilize food wrappers configured to be opened and re-closed at any time before, during, or after sous vide cooking, so that ingredients may be added or removed, and/or to adjust foods being cooked, and/or for other reasons.

Figure 42:
FIG. 42 shows a prior art sous vide preparation set up for cooking a meal for a family of five, including two water baths 2026, two immersion sous vide water circulators 2028, a vacuum bag sealer 2030, and a grilling plate 2032. The meal to include a main dish, such as, as non-limiting and non-exhaustive examples a meat or poultry or seafood article, and the meal to include a side dish, such as a vegetable.

Other methods of sous vide cooking may comprise a serial process of:
vacuum wrapping foods in plastic bags, using a vacuum bag sealer 2030 (as shown in FIG. 42), or other means,
placing the wrapped foods into an aqueous, precision thermally controlled, environment 2026 2028 (as shown in FIG. 42) for a continuous predetermined period of time,
removing the foods from the aqueous environment,
unwrapping and optionally thermally coloring the exterior surfaces of the food using a grill plate 2032 (as shown in FIG. 42), torch, frypan, or other means, and
serving the food.

This implicitly means a user must be present to start the above process within a specific time range before the food is to be served.

Embodiment 2000 may utilize sous vide's natural ability to pasteurize (partially or fully sterilize) wrapped foods, to extend initiation of the sous vide cooking process to a time most convenient for the user. This may involve additional steps to pasteurize the wrapped food, at temperatures at or below sous vide cooking temperatures at the commencement of cooking, followed by a controlled dormancy period, followed by a period of reheating the food to serving temperatures, and/or completing any sous vide cooking necessary, in time for serving.

The immediately above processes may be easily automated and controlled, allowing initiation of the sous vide cooking process to occur, as non-limiting and non-exhaustive examples, many hours or days in advance of serving.

Embodiment 2000 may utilize controls which specify a precise time of day which the food is to be served, rather than forcing the user to make difficult calculations based on subtracting the sous vide preparation time from the specific time of day the food is to be served.

As a specific, non-limiting and non-exhaustive example, a user, who is part of a family of five, is in their kitchen at 6:30 AM, and wants to have a 7 PM dinner including 5-three-quarter inch thick salmon steaks, and 5 servings of asparagus.

The user removes the salmon and asparagus from the refrigerator, wrap each serving of salmon and asparagus in aluminum foil containers, and presses each container into conformal face-to-face contact with the contained food.

Figure 43:
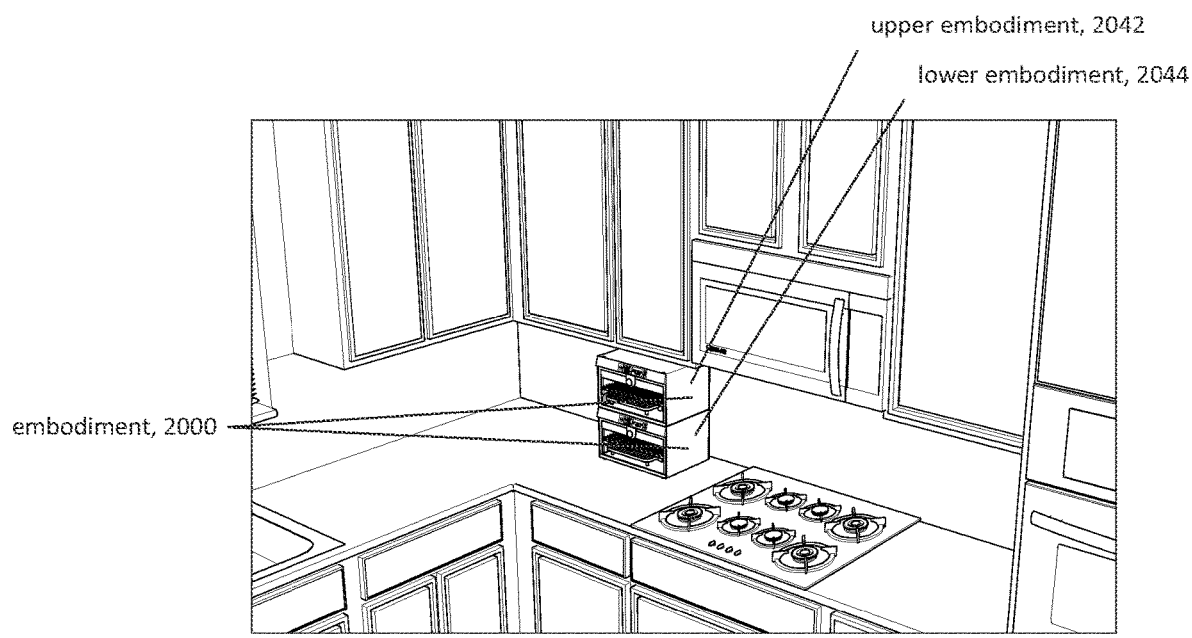
FIG. 43 shows a contrasting to FIG. 42 sous vide preparation set up, using present inventions for cooking an identical meal for a family of five, using two embodiment 2000s.

Referring to FIG. 43, the user, using two embodiment 2000s stacked one above the other (as shown in FIG. 43), places each wrapped salmon serving into upper embodiment 2042, and each wrapped serving of asparagus, into lower embodiment 2044.

Figures 44, 45, 46:
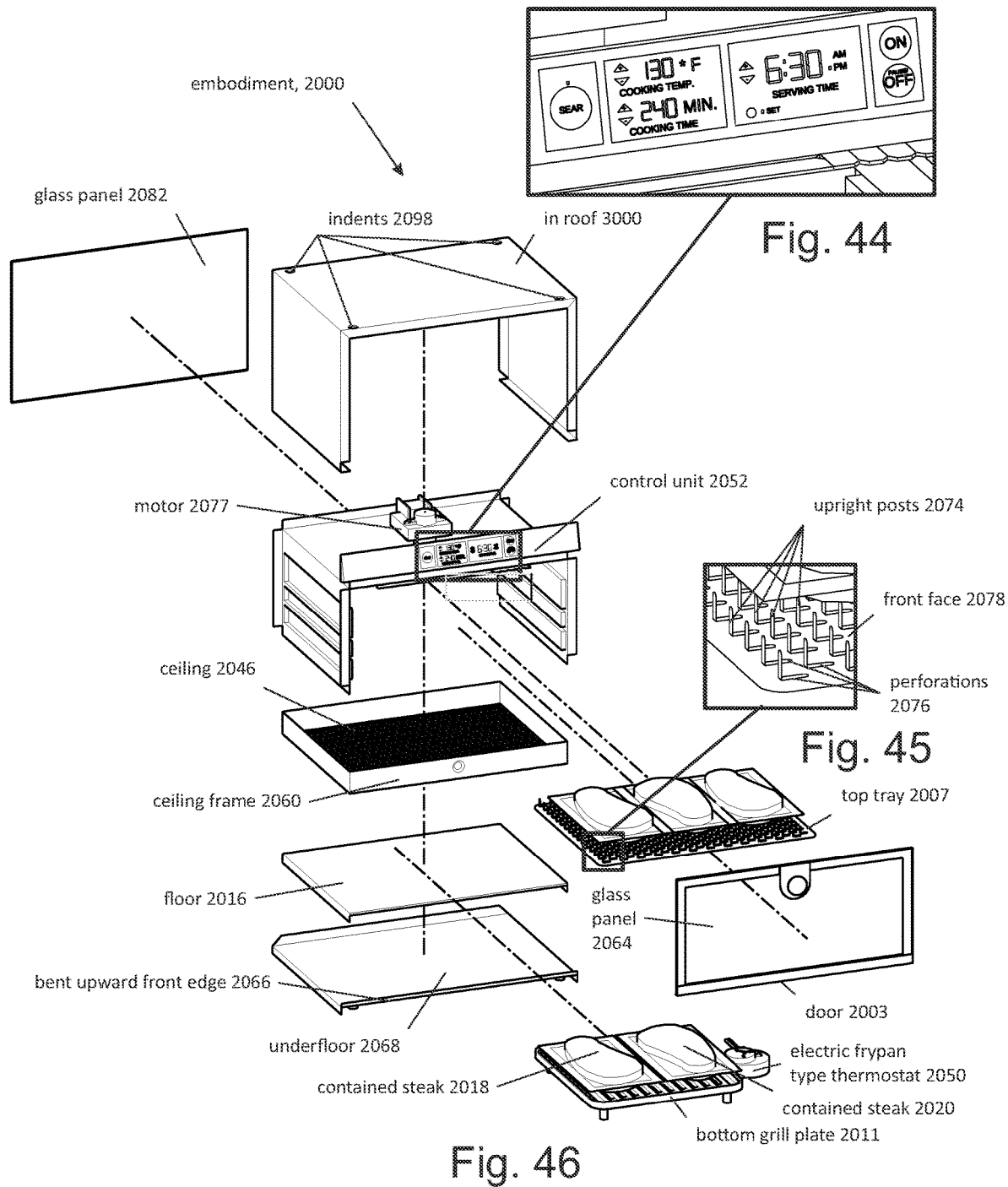
FIG. 44 is a detail of FIG. 46, as indicated in FIG. 46.
FIG. 45 is a detail of FIG. 46, as indicated in FIG. 46.
FIG. 46 is a forward exploded view of embodiment 2000.

Referring to FIG. 44, the user then sets on upper embodiment 2042, the "COOKING TEMP." to 130° F., and the "COOKING TIME" to 20 minutes, the sous vide cooking temperatures and times recommended for three-quarter inch thick salmon steaks. The user also sets the "SERVING TIME" to 7:00 PM, and presses the "ON" button.

Figure 39:
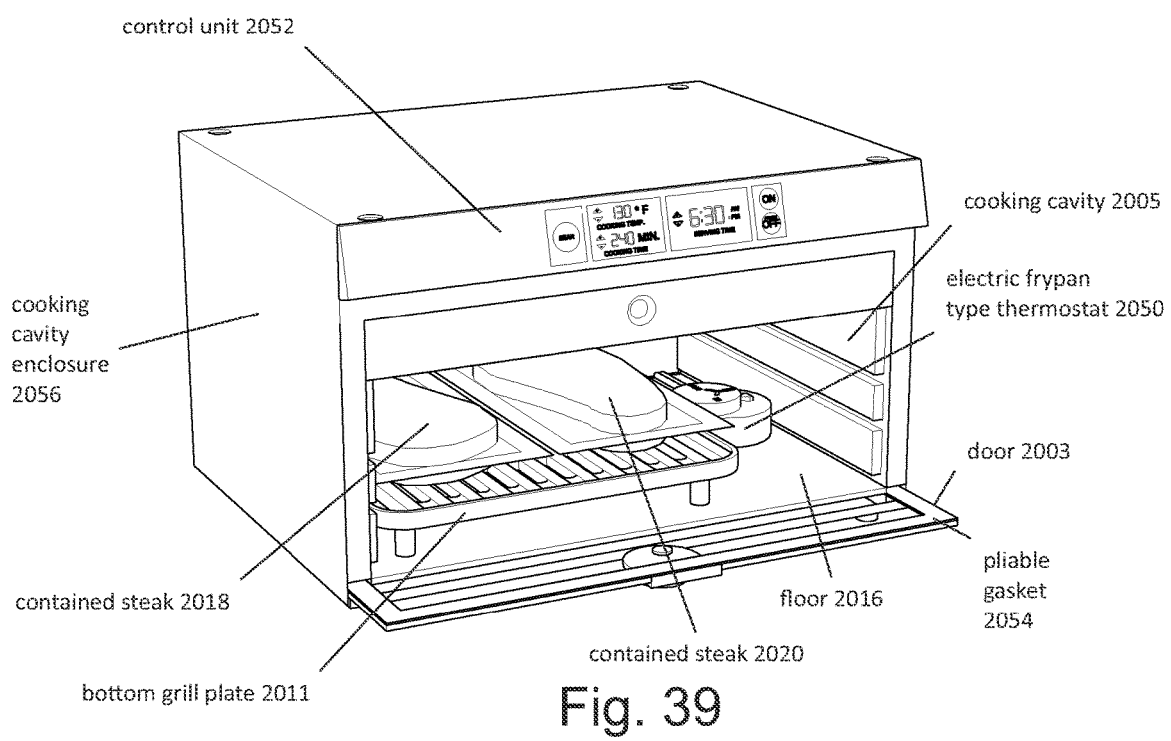
FIG. 39 is identical to FIG. 38, but with top tray 2007 and bottom tray 2009 removed and contained steaks 2018 and 2020 supported by bottom grill plate 2011.
Figure 41:
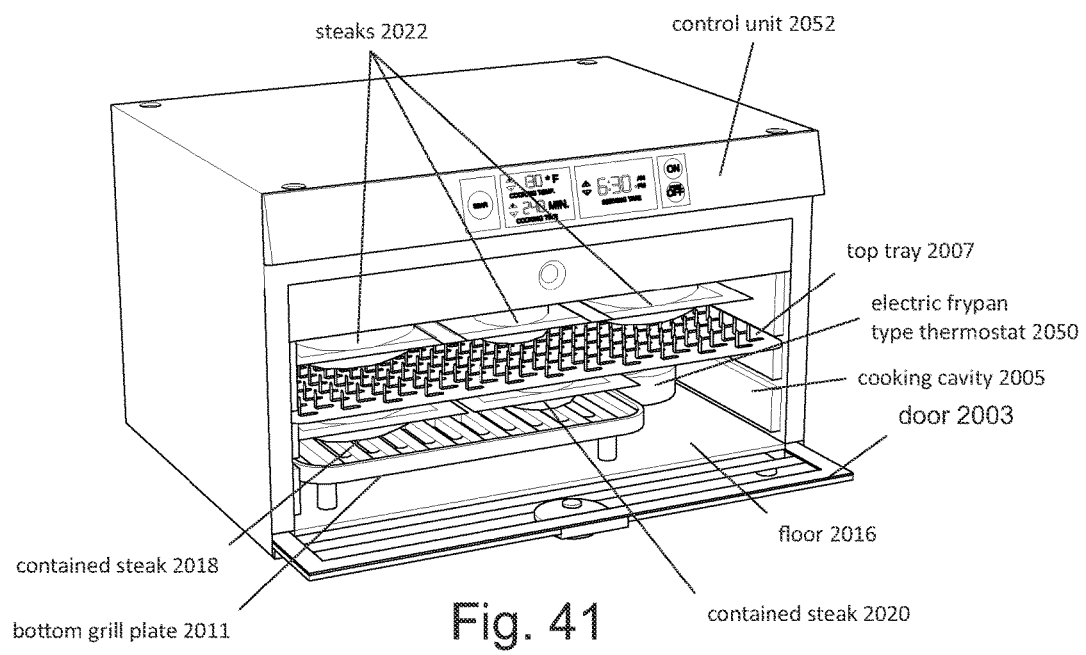
FIG. 41 is identical to FIG. 39, but with top tray 2007 added supporting steaks 2022.

If the user wants grill marks, he places the lower 2 pieces of salmon directly on bottom grill plate 2011 (FIGS. 39 and 41).

Again referring to FIG. 44, the user also sets on lower embodiment 2044, the "COOKING TEMP." to 183° F., and the "COOKING TIME" to 40 minutes, the sous vide cooking temperatures and times recommended for asparagus. And again, the user sets the "SERVING TIME" to 7:00 PM, and presses the "ON" button.

At 7 PM. the dinner is ready and merely needs to be unwrapped on a plate and served.

If the user wants grill marks on the salmon, he may press the "SEAR" button (FIG. 44) during the initial set up, and the salmon steaks resting directly on bottom grill plate 2011 will have grill marks automatically seared into the bottom of them before the serving time. With some configurations, of embodiment, 2000, the user may first have to open door 2003 before searing can take place.

Alternatively, with no advance setting, and at any time, including specifically the meal serving time, the salmon steaks resting on bottom grill plate 2011 may have grill marks seared in their bottom surfaces by pressing the "SEAR" button (FIG. 44) at serving time and waiting a few minutes for searing to take place. Likewise, the salmon steaks resting directly on bottom grill plate 2011 may be flipped over, and the "SEAR" button pressed again to get grill marks seared into both sides of the salmon steaks.

In a similar fashion, any and all salmon steaks remaining in embodiment 2000 may have grill marks seared into them by placing the side to be seared directly onto bottom grill plate 2011 and pushing the "SEAR" button, and waiting for searing to take place.

Figure 40:
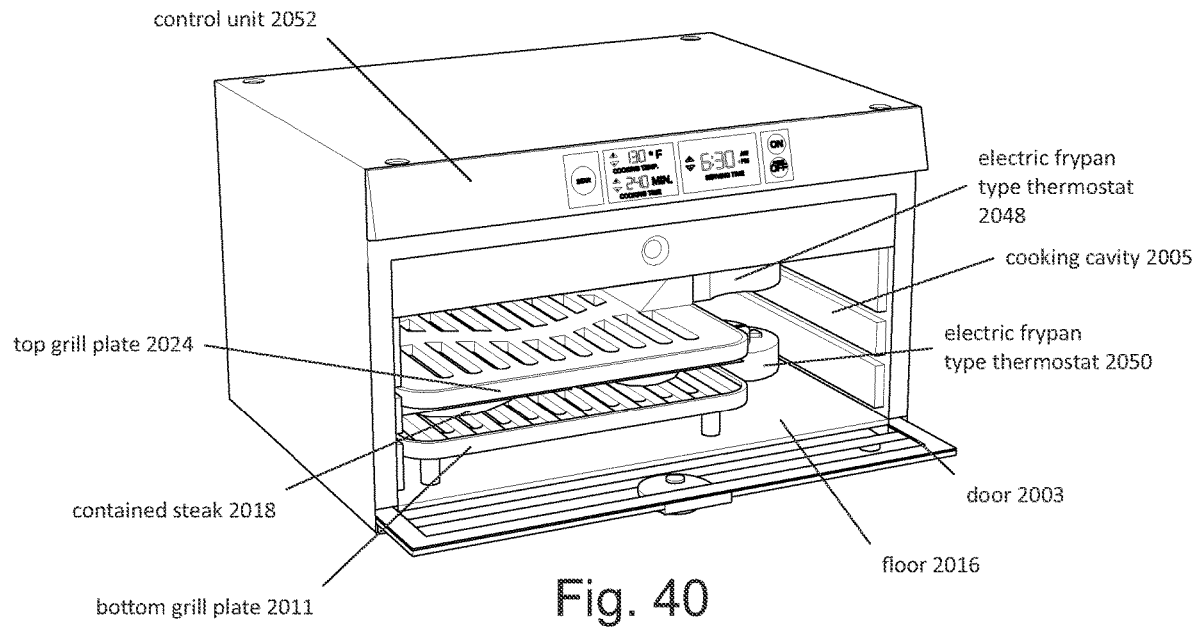
FIG. 40 is identical to FIG. 39, but with top grill plate 2024 added.

Alternatively, as shown in FIG. 40, top grill plate 2024 may be introduced into oven cavity 2005 to simultaneously sear grill marks into both sides of food at any time.

Top grill plate 2024 and bottom grill plate 2011 receive power from receptacles (not shown) disposed in the ceiling 2046.

Top grill plate 2024 and bottom grill plate 2011 may be individually thermostatically controlled, as non-limiting and non-exhaustive example, by electric frypan type thermostats 2048 and 2050 respectively (FIG. 40), to give independently controlled degree of grill marks.

Or alternatively, they may be electronically controlled. As a non-limiting and non-exhaustive examples, top grill plate 2024 and bottom grill plate 2011, independently or in unison, may receive full power from control unit 2052 for various durations dependent on what degree of seared grill marks the user desires. Or seared grill marks may be controlled by other means. Grilling amounts can be electronically controlled through many possible alterations of the timing and amount of current they receive from control unit 2052.

Using such electronic control may eliminate the need for space consuming electric frypan type thermostats 2048 2050 (FIG. 40), and move the grilling amount user input to control unit 2052 (FIG. 40). This in turn may allow for larger top and bottom grill plates with greater capacities.

Embodiment 2000 may contain in cooking cavity 2005: top tray 2007, bottom tray 2009, bottom grill plate 2011 (FIG. 36), and top grill plate 2024 (FIG. 40). It also may contain one or more paired vertical grill plates 2034 (FIG. 56). These may be used in any useful combination and/or configuration.

Figure 36:
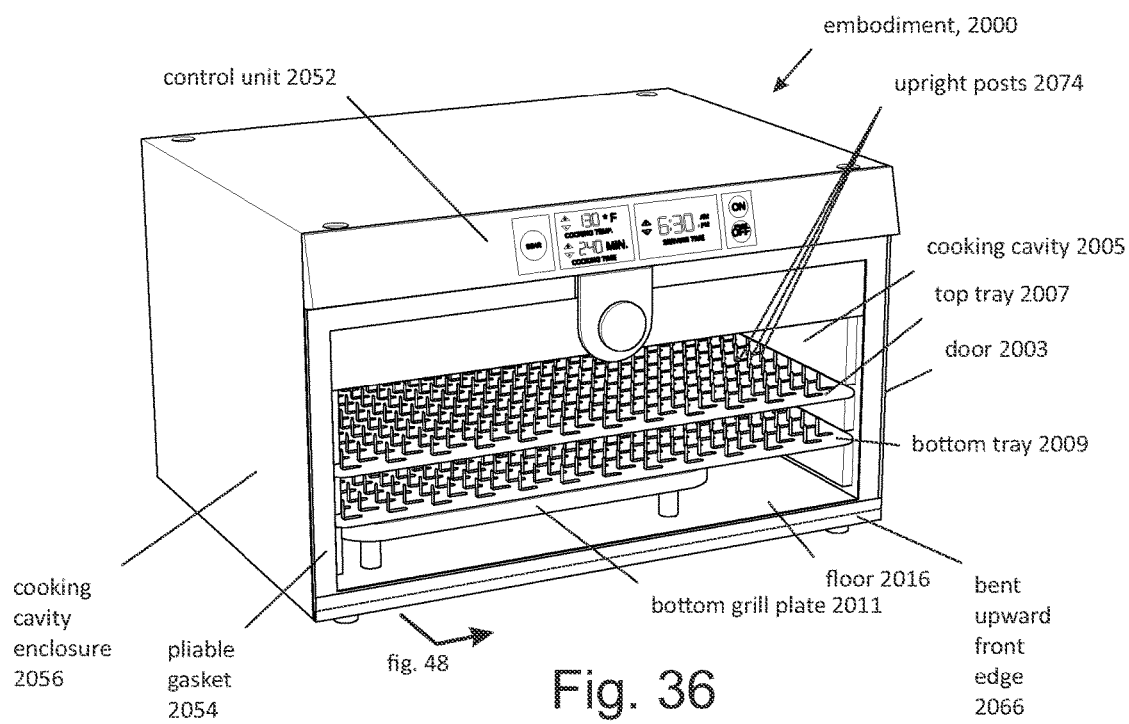
FIG. 36 is a perspective of embodiment, 2000, which is an embodiment of present inventions, with door 2003 in its close disposition, and cooking cavity 2005, containing top tray 2007, bottom tray 2009, and bottom grill plate 2011 (see also FIGS. 48 and 49).
Figure 37:
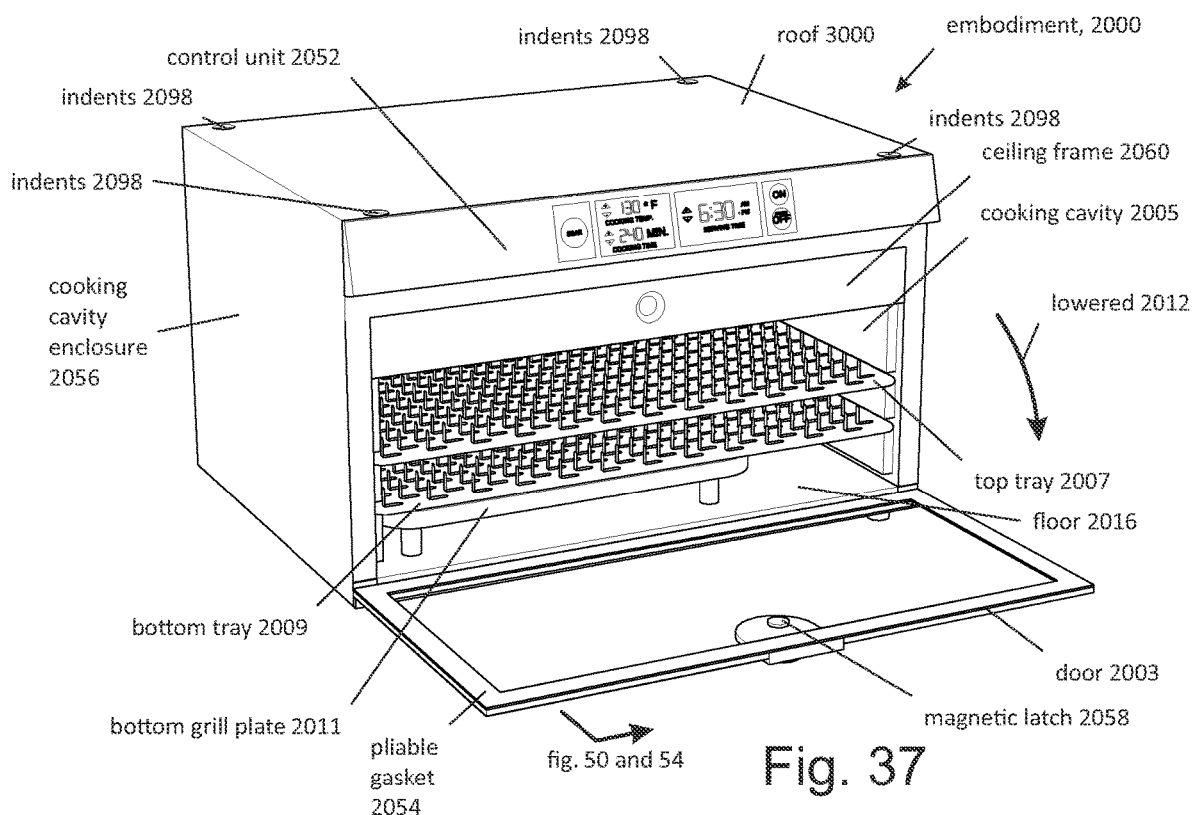
FIG. 37 is identical to FIG. 36 but with door 2003 lowered 2012, thus opening cooking cavity 2005 (see also FIGS. 50 and 51).

Door 2003 may be raised to enclose cooking cavity 2005 (FIGS. 36 and 48). Such enclosure is facilitated by pliable perimeter gasket 2054, which helps seal door 2003 against cooking cavity enclosure 2056 (FIGS. 36 and 37).

Just below the upper edge of door 2003, is magnetic latch 2058 (FIG. 37), which may couple door 2003 to ceiling frame 2060, when door 2003 is in its closed disposition (FIG. 36).

At any advantageous disposition proximate to door 2003, including specifically proximate to the upper edge of door 2003, an interlock switch (not shown) may be mounted inside control unit 2052, and be reactive to whether or not door 2003 is in its closed disposition (FIG. 36). Such an interlock switch might be activated by direct contact, or by magnetism, or by proximity electronics, or by other ways.

An interlock switch may serve any useful purpose, including specifically, communicating with circuitry, which only allows the operation of bottom grill plate 2011 and/or top grill plate 2024 when door 2003 is not closed (36).

This in turn would mean bottom and side interior surfaces of cooking cavity 2005 would only be exposed to approximately sous vide cooking temperatures which in general are below 212° F. This may allow use of inexpensive materials, including plastics, in the fabrication of embodiment, 2000.

Figure 38:
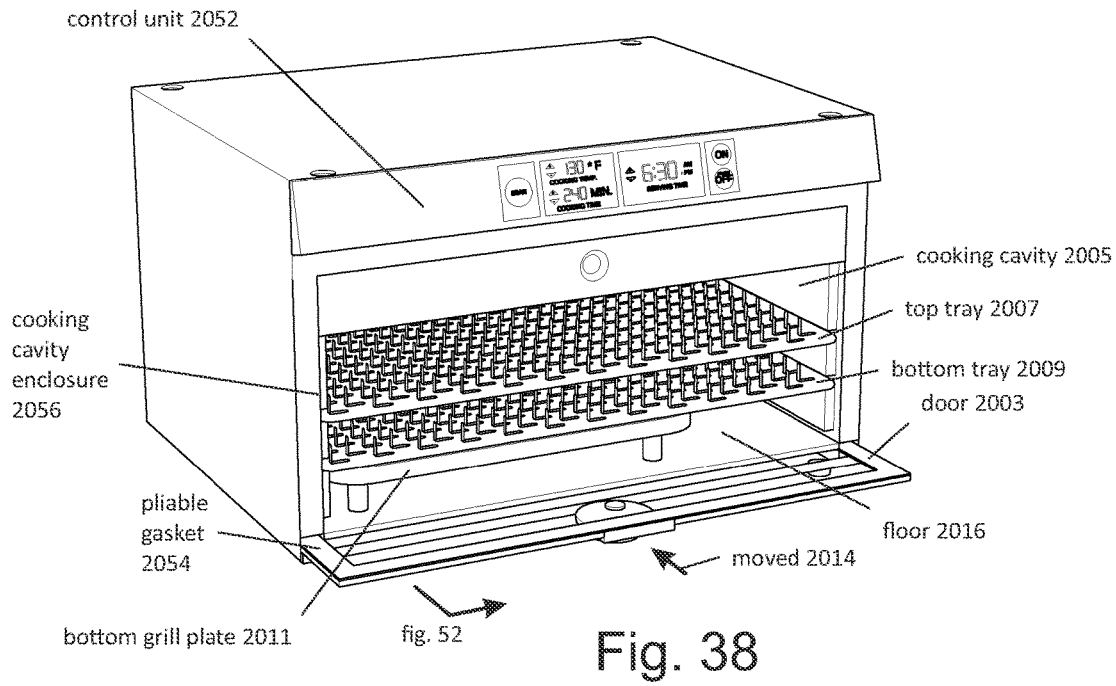
FIG. 38 is identical to FIG. 37 but with door 2003 moved 2014 under floor 2016 (see also FIGS. 52 and 53).

Door 2003 may be disposed in at least three dispositions, as illustrated in FIGS. 36, 37, and 38.

First disposition, its closed disposition, FIGS. 36, 48, and 49, door 2003 and its glass panel 2064 are generally vertical, closing the front opening of cooking cavity 2005. In this disposition, a lower portion of the glass panel 2064's front face rests against the back of bent up front edge 2066 of underfloor 2068 (FIGS. 48 and 49).

Also, in this first disposition, the bottom forward edge of glass panel 2064 rests on bent upward front edge 2066 of underfloor 2068, and a lower portion of back face of door 2003 rests against the bent down, forward edge 2070 of floor 2016 (FIGS. 48 and 49).

In the second disposition, door 2003's initially open disposition, FIGS. 37, 50, and 51, door 2003 is swung 2072 to a horizontal disposition (FIGS. 50 and 51) allowing access to cooking cavity 2005. In the second disposition, bent up tabs 2074 (particularly FIGS. 47 and 55) are disposed behind, bent down forward edge 2070 of floor 2016 (particularly FIG. 55), thus preventing door 2003 from being pulled forward.

In the third disposition, door 2003's compacted disposition, (FIGS. 38, 52, and 53) door 2003 is slid 2062 (FIG. 52) below floor 2016, thus moving it out of the way of the user.

This three disposition configuration of cooking cavity 2005 door 2003 closure is directed to, as non-limiting and non-exhaustive examples, easy one-handed user operation, full open access to cooking cavity 2005, and minimal door encroachment on user operations.

Embodiment 2000 may use bottom tray 2009 and top tray 2007 to support foods during sous vide cooking. These trays comprise substantially equidistant upright posts 2074 raising from front faces 2078 of trays 2009 and 2007 (particularly FIGS. 45 and 46). Post 2074 elevate and support foods being sous vide cooked, and allow free air circulation around foods to promote efficient, fast, and even sous vide cooking.

To promote moving, precisely temperature controlled, air circulation, required for sous vide cooking, within cooking cavity 2005, embodiment 2000 uses motor 2077 (FIG. 46) driven axial fan 2078 (FIGS. 47 and 47A) to upwardly suck in and radially disperse over toaster-like bare wire sheet heating elements 2080, cooking cavity 2005 air.

Alternatively, other types of powered radial dispersion impellers may be used.

When compared with sheathed heating elements, use of a bare wire heating elements reduces latency of controlled heat exchange and promotes precise air temperature control. Bare wire heating elements are also among the simplest and least expensive heating elements available.

Many regimes of heating air within cooking cavity 2005 may be used. Rather than simply sequentially turning on, and then off, and then on again, etc. a heating element, it may be advantageous to create more precise cooking temperatures, to continuously keep the heating element heated with enough energy to equal thermal losses from cooking cavity 2005, and then add or subtract small amounts of energies to this baseline to compensate for acute variances in cooking cavity 2005 temperatures.

Cooking cavity 2005 uses glass panel 2082 as its rear wall. This may add light and visual interest to cooking cavity 2005.

Figure 57:
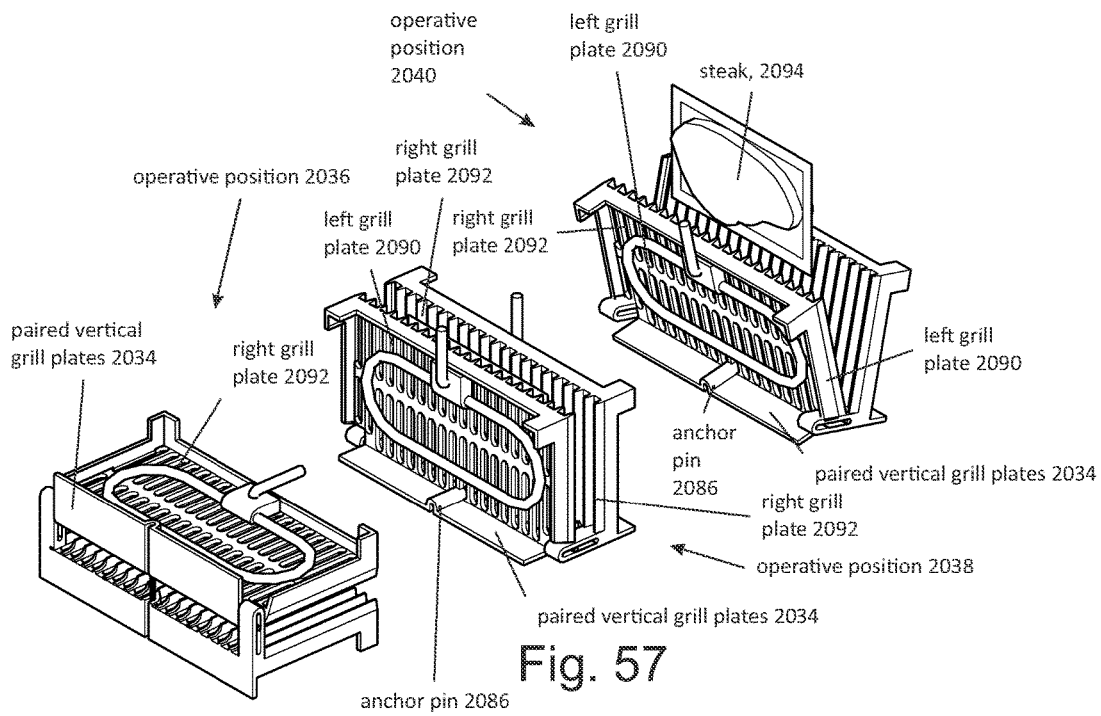
FIG. 57 shows a perspective of operative positions 2036, 2038, and 2040 for paired vertical grill plates 2034.
Figure 58:
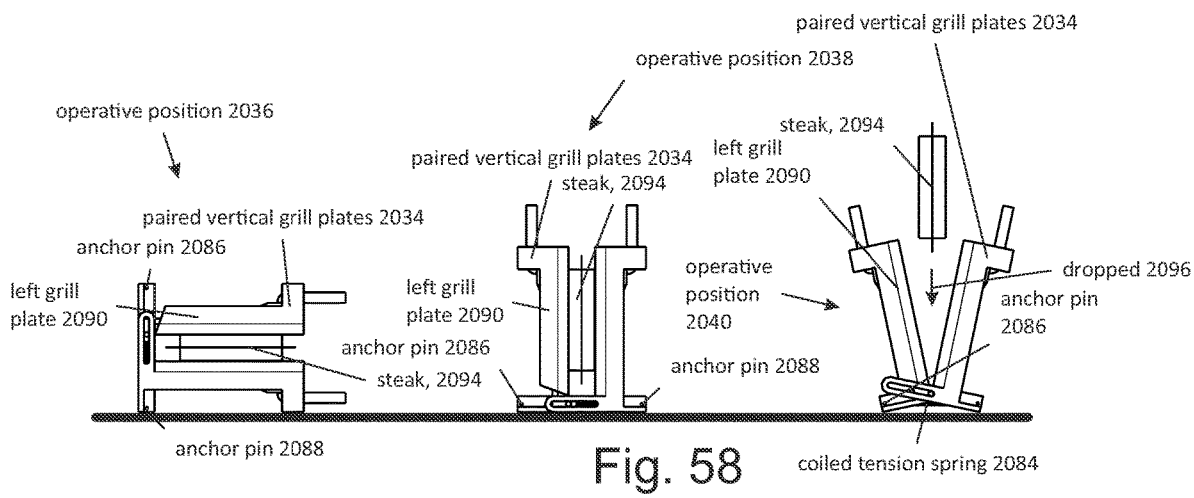
FIG. 58 shows a front profile of operative positions 2036, 2038, and 2040 for paired vertical grill plates 2034.

FIGS. 56 through 58 show the construction and use of paired vertical grill plates 2034. Paired vertical grill plates 2034 may receive power from receptacles (not shown) in ceiling 2046. Some types of foods, including, but not limited to, some cuts of meat, are more efficiently branded with grill marks when the foods are vertically compressed between heated, vertical, grilling plates.

FIGS. 56, 57, and 58 show paired vertical grill plates 2034 may brand grill marks into foods in either a horizontal disposition (operative position 2036, FIGS. 57 and 58) or a vertical disposition (operative position 2038, FIGS. 57 and 58).

Helical tension spring 2084, stretched between anchor pins 2086 and 2088 (FIGS. 57 and 58) pull left grill plate 2090 and right grill plate 2092 towards each another.

When the tops of grill plates 2090 and 2092 are moved apart, because of spring tension from helical tension spring 2084, and the geometry of grill plates 2090 and 2092, paired vertical quilt plates 2034 rest stably in open operative position 2040 (FIGS. 57 and 58).

When food, like steak 2094, is dropped 2096 (FIG. 58) between the open opposing plates, the geometry of the plates and the weight steak 2094 causes the plates to compress steak 2094 between them (operative disposition 2038, FIGS. 57 and 58) under spring tension created by helical tension spring 2084.

This configuration may allow simple one-handed operation of paired vertical grill plates 2034.

Indents 2098 in roof 3000 of embodiment 2000 (FIG. 46), may receive supportive feet 3002 (FIG. 47) of an adjoining embodiment 2000 to facilitate stacking of one or more additional embodiment 2000s (FIG. 43). It is advantageous to make sure at least two embodiment 2000s can stack within the space between a kitchen countertop and its standard height over countertop cabinet (FIG. 43) because this configuration may reduce the counterspace needed to sous vide prepare, using present inventions, a two or more-course dinner as described earlier for FIG. 43.

As can be readily seen when comparing preparing a typical family meal using sous vide equipment found in prior art, versus equipment using present inventions (FIG. 42 verses FIG. 43), equipment using present inventions may greatly reduce kitchen storage and countertop space requirements when compared to prior art.

When compared to prior art, as can be seen by the above written specification, embodiments utilizing present inventions may also greatly reduce labor and time required to sous vide prepare a meal.

When compared to prior art, as can also be seen from the above written specification, embodiments utilizing present inventions may be much more convenient for users.

What is claimed is:
1. A device for sous vide cooking, comprising:
   a food wrapper fabricated from malleable, thermally transmissive, sheet material, deformed under pressure into a contoured compartment having conformal face-to-face contact with, exterior surfaces of a food being cooked in the food wrapper,
   an air filled cooking chamber configured to contain the food wrapper and the food being cooked in the food wrapper, a user input, configured to receive user specified cooking parameters for cooking within the cooking chamber, a controlled powered heat source, configured to receive user specified cooking parameters from the user input, the controlled power heat source being in communication with the cooking chamber and configured to heat air within the cooking chamber to a temperature below a boiling point of water in accordance with selected sous vide cooking specifications; and a first powered grill plate disposed within the cooking chamber, the first powered grill plate being configured to heat and thermally color exterior surfaces of the foods being sous vide cooked, before, during, and/or after sous vide cooking.

2. The device of claim 1, further comprising a second powered grill plate opposed to the first powered grill plate, the first and the second grill plates configured to cooperatively heat and thermally color two sides of foods being sous vide cooked, before, during, and/or after sous vide cooking.

3. A device for sous vide cooking, comprising:

a food wrapper fabricated from malleable, thermally transmissive, sheet material, deformed under pressure into a contoured compartment having conformal face-to-face contact with, exterior surfaces of a food being cooked in the food wrapper, an air filled cooking chamber configured to contain the food wrapper and the food being cooked in the food wrapper, a user input, configured to receive user specified cooking parameters for cooking within the cooking chamber, and a controlled powered heat source, configured to receive user specified cooking parameters from the user input, the controlled power heat source being in communication with the cooking chamber and configured to heat air within the cooking chamber to a temperature below a boiling point of water in accordance with selected sous vide cooking, specifications;

wherein foods being sous vide cooked within the cooking chamber are supported on a plurality of vertical posts.

4. A device for sous vide cooking, comprising:

a food wrapper fabricated from malleable, thermally transmissive, sheet material, deformed under pressure into a contoured compartment having conformal face-to-face contact with, exterior surfaces of a food being cooked in the food wrapper, an air filled cooking chamber configured to contain the food wrapper and the food being cooked in the food wrapper, a user input, configured to receive user specified cooking parameters for cooking within the cooking chamber, and a controlled powered heat source, configured to receive user specified cooking parameters from the user input, the controlled Lower heat source being in communication with the cooking chamber and configured to heat air within the cooking chamber to a temperature below, a boiling point of water in accordance with selected sous vide cooking specifications;

wherein the cooking chamber includes a chamber floor and a front access door configured to swing forward and down to open, and slide under the chamber floor.

5. A device for sous vide cooking, comprising:

a food wrapper fabricated from malleable, thermally transmissive, sheet material, deformed under pressure into a contoured compartment having conformal face-to-face contact with, exterior surfaces of a food being cooked in the food wrapper, an air filled cooking chamber configured to contain the food wrapper and the food being cooked in the food wrapper, a user input, configured to receive user specified cooking parameters for cooking within the cooking chamber, a controlled powered heat source, configured to receive user specified cooking parameters from the user input, the controlled power heat source being in communication with the cooking chamber and configured to heat air within the cooking chamber to a temperature below a boiling point of water in accordance with selected sous vide cooking specifications, and a duplicate cooking chamber stacked on top of the cooking chamber, wherein the pair of stacked cooking chambers are configured to rest on a kitchen countertop below over countertop kitchen cabinetry.

* * * * *